(12) United States Patent
Tagami et al.

(10) Patent No.: US 10,872,631 B1
(45) Date of Patent: Dec. 22, 2020

(54) MAGNETIC DISK DEVICE AND SERVO READ PROCESSING METHOD

(71) Applicants: Kabushiki Kaisha Toshiba, Tokyo (JP); Toshiba Electronic Devices & Storage Corporation, Tokyo (JP)

(72) Inventors: Naoki Tagami, Kanagawa (JP); Takeyori Hara, Kanagawa (JP); Takayuki Kawabe, Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/800,039

(22) Filed: Feb. 25, 2020

(30) Foreign Application Priority Data

Sep. 6, 2019 (JP) .................................. 2019-163225

(51) Int. Cl.
*G11B 5/09* (2006.01)
*G11B 5/596* (2006.01)
*G11B 5/55* (2006.01)
*G11B 5/012* (2006.01)

(52) U.S. Cl.
CPC .......... *G11B 5/59655* (2013.01); *G11B 5/012* (2013.01); *G11B 5/5547* (2013.01); *G11B 5/59688* (2013.01)

(58) Field of Classification Search
None
See application file for complete search history.

(56) References Cited

U.S. PATENT DOCUMENTS

| 4,809,091 A * | 2/1989 | Miyazawa ........... G11B 5/5521 360/48 |
| 6,198,707 B1 * | 3/2001 | Yamamoto ............. G11B 19/02 369/47.25 |
| 2002/0012298 A1 * | 1/2002 | Suzuki ................... G11B 20/10 369/47.3 |
| 2002/0044507 A1 * | 4/2002 | Hagiwara .......... G11B 20/1217 369/47.4 |
| 2005/0185320 A1 * | 8/2005 | Ueda ...................... G11B 5/596 360/78.04 |
| 2006/0126208 A1 | 6/2006 | Kitamura et al. |
| 2009/0002866 A1 | 1/2009 | Shaver et al. |
| 2009/0231751 A1 | 9/2009 | Asakura et al. |

* cited by examiner

*Primary Examiner* — Peter Vincent Agustin
(74) *Attorney, Agent, or Firm* — White & Case LLP

(57) ABSTRACT

According to one embodiment, a magnetic disk device includes a disk including a first servo sector including a first preamble, a first servo mark, a first gray code, and first burst data, a head including a write head which writes data to the disk and a read head which reads data from the disk, and a controller which stops write processing, based on a write mask gate different from a first servo gate executing read processing of the first servo sector and a write gate executing the write processing to the disk.

20 Claims, 22 Drawing Sheets

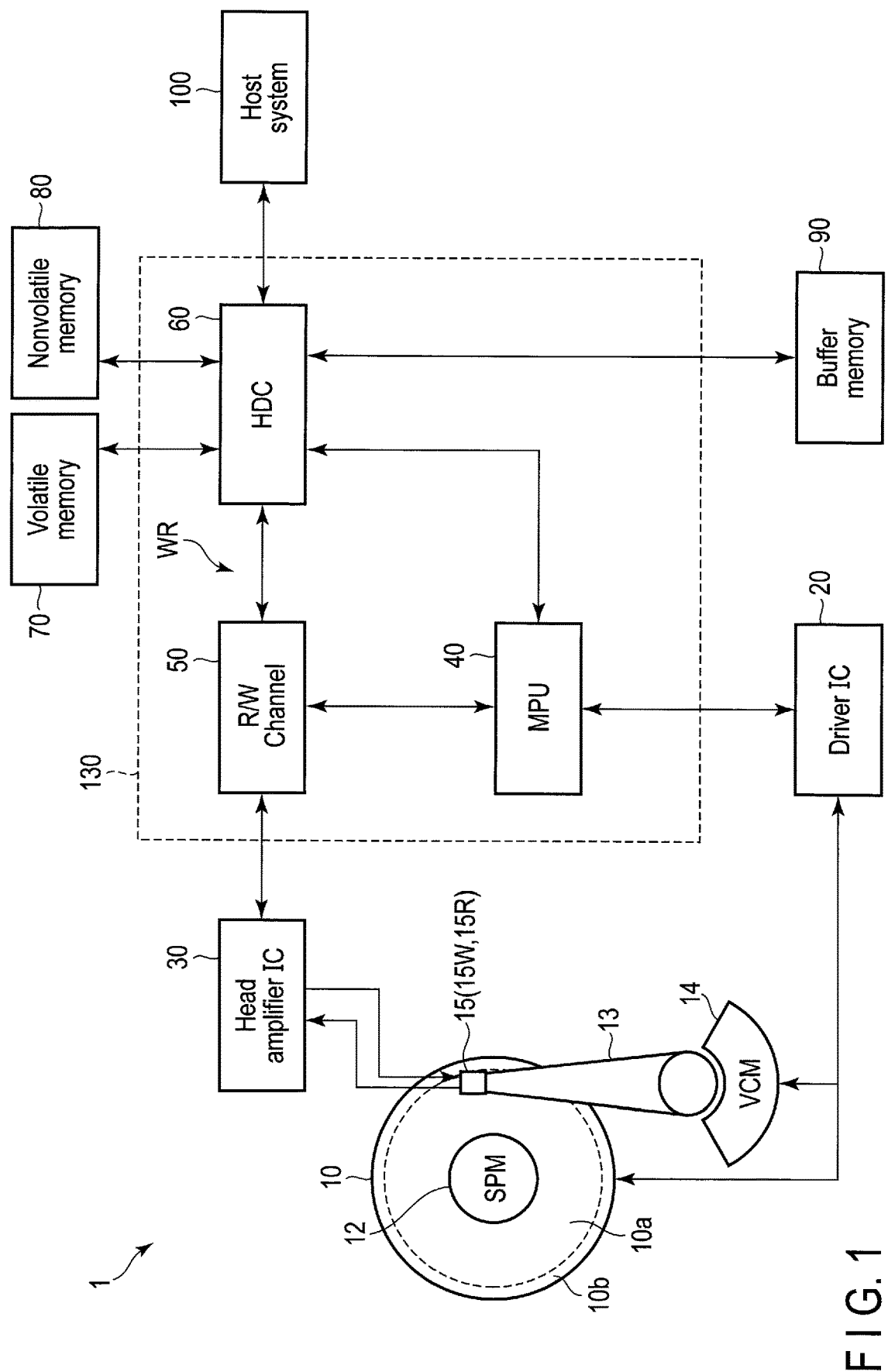
F I G. 1

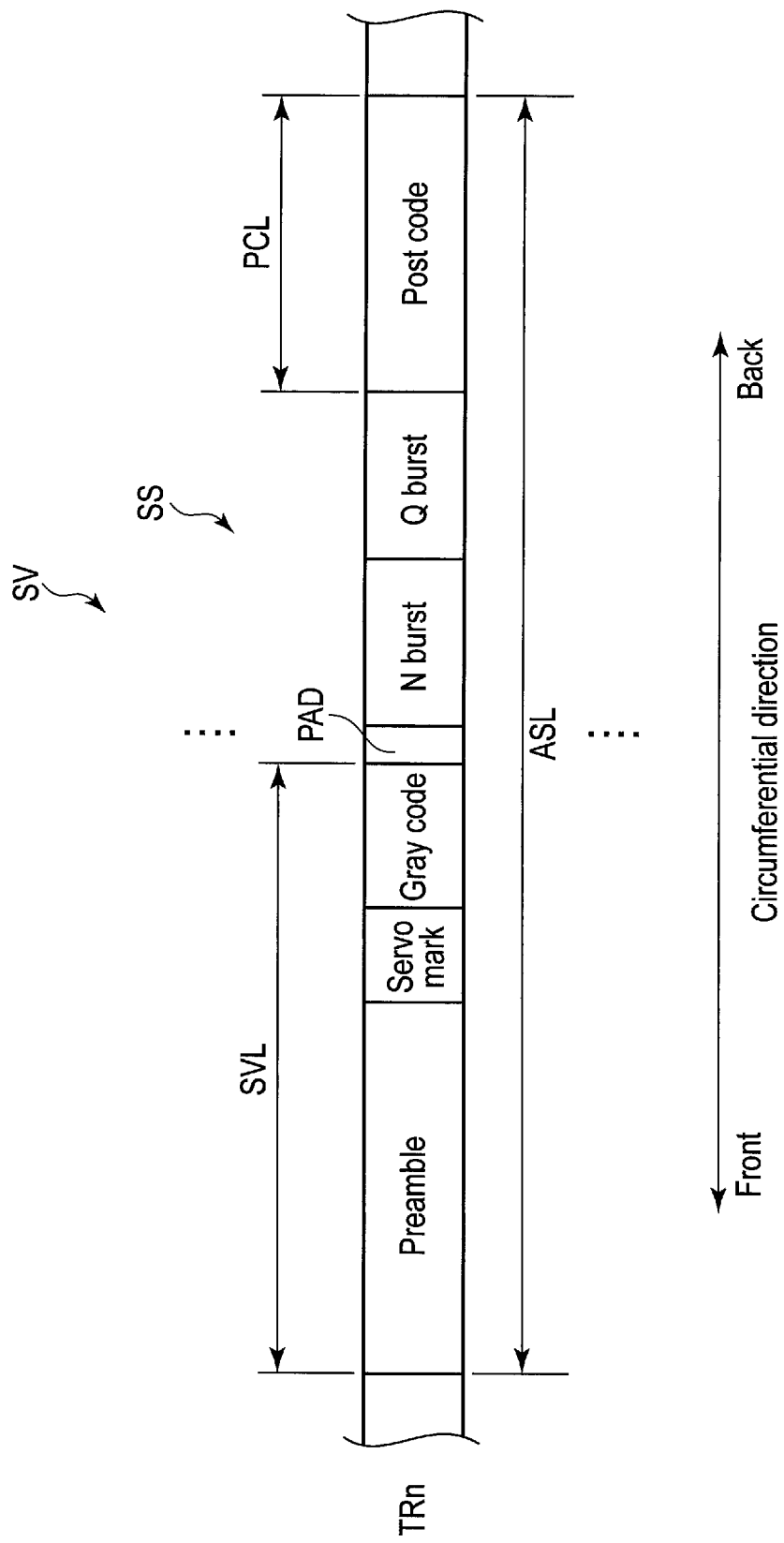
F I G. 3

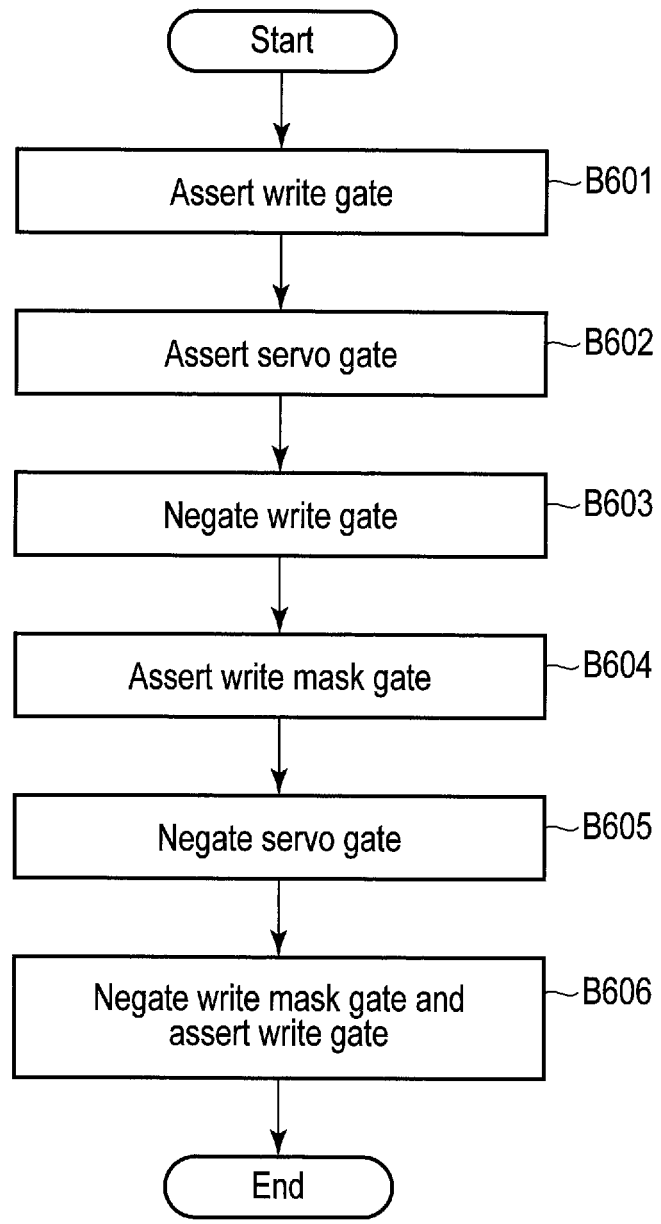
F I G. 6

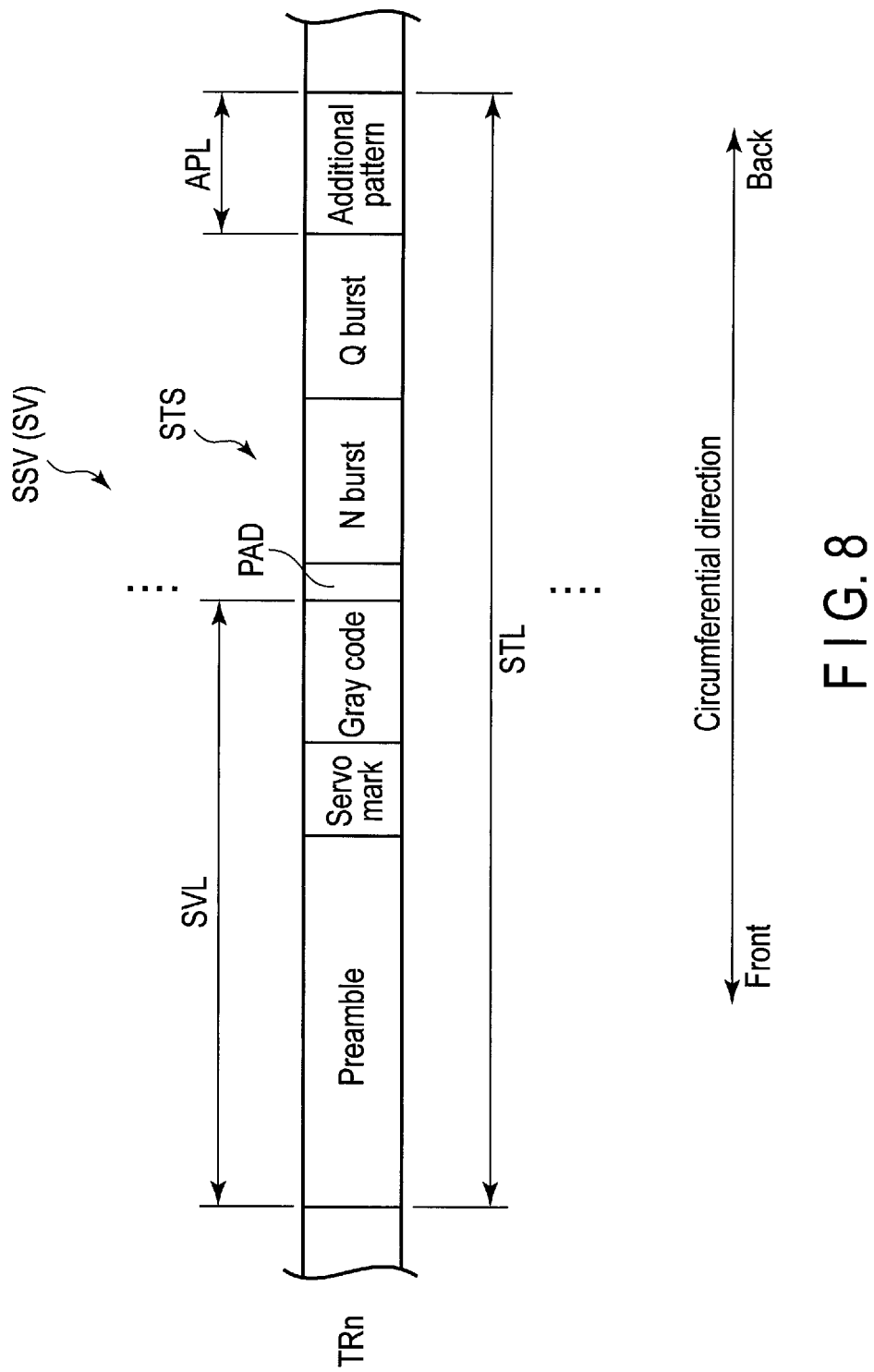
F I G. 8

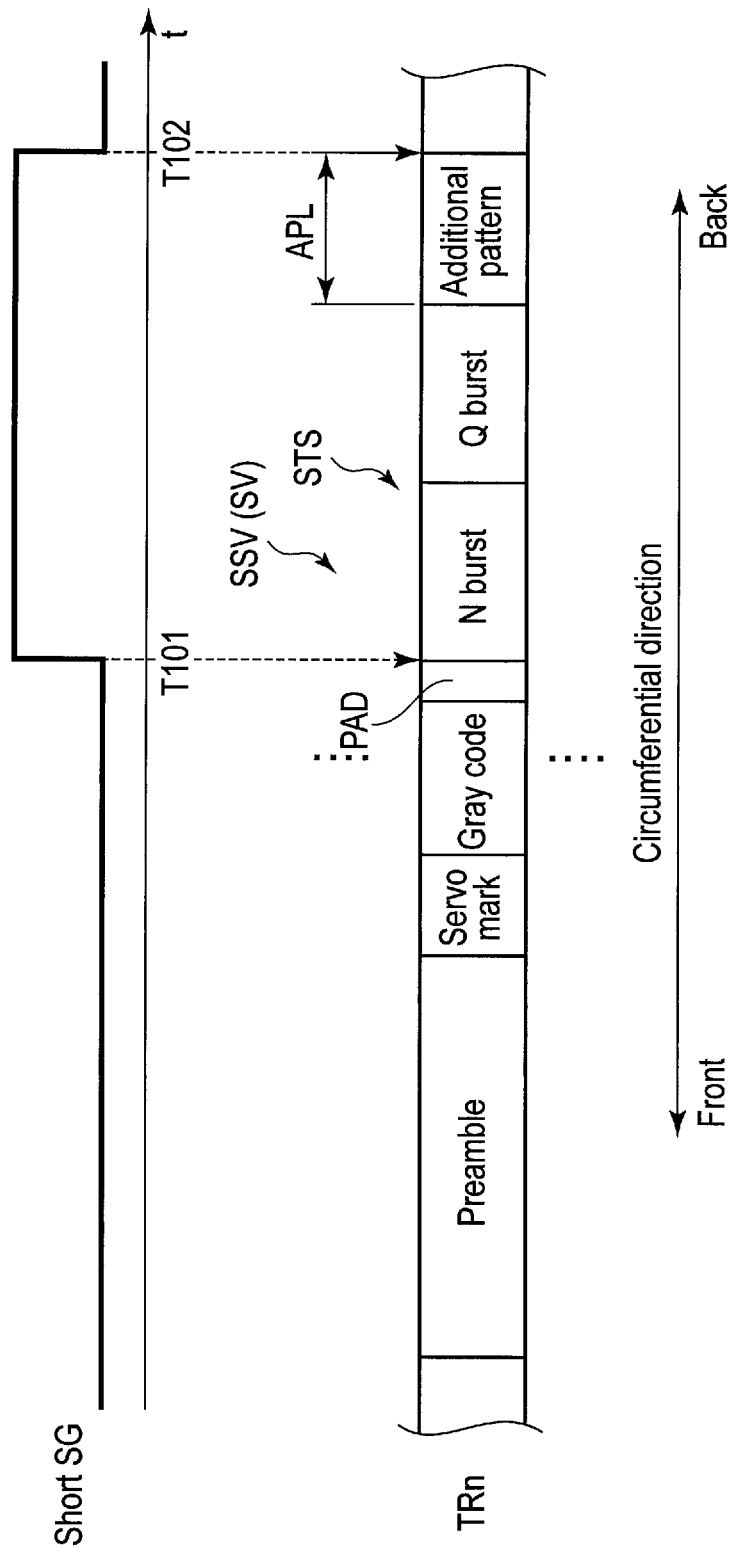
F I G. 10

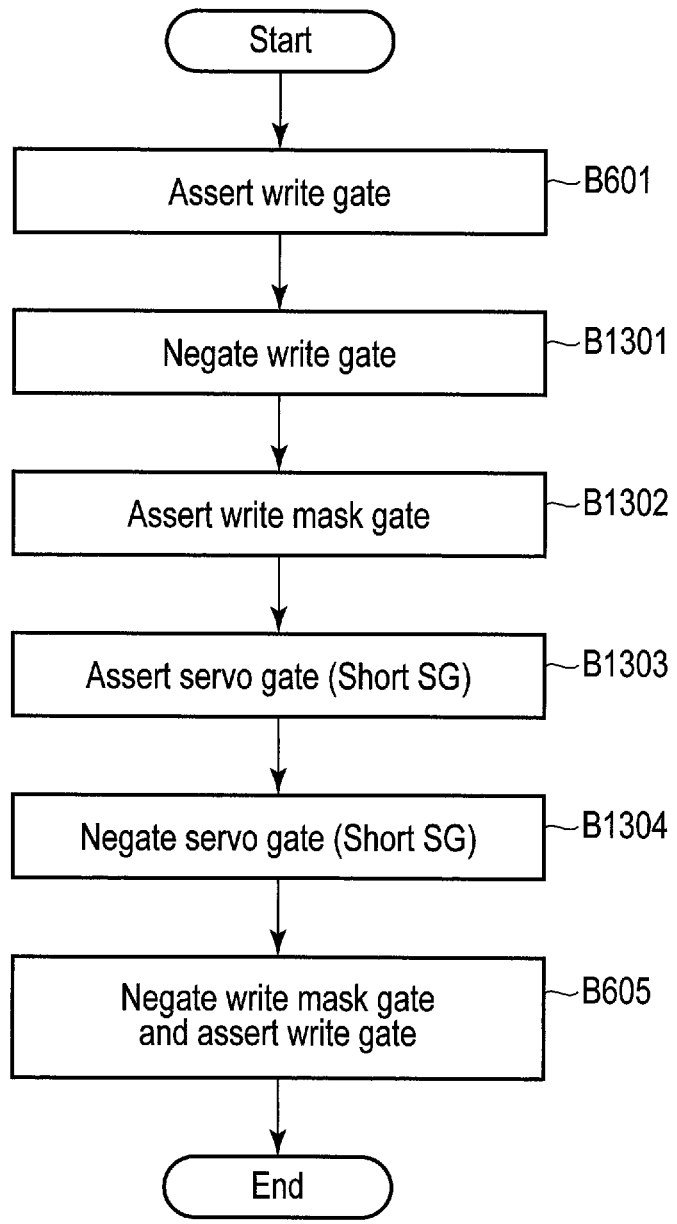
F I G. 13

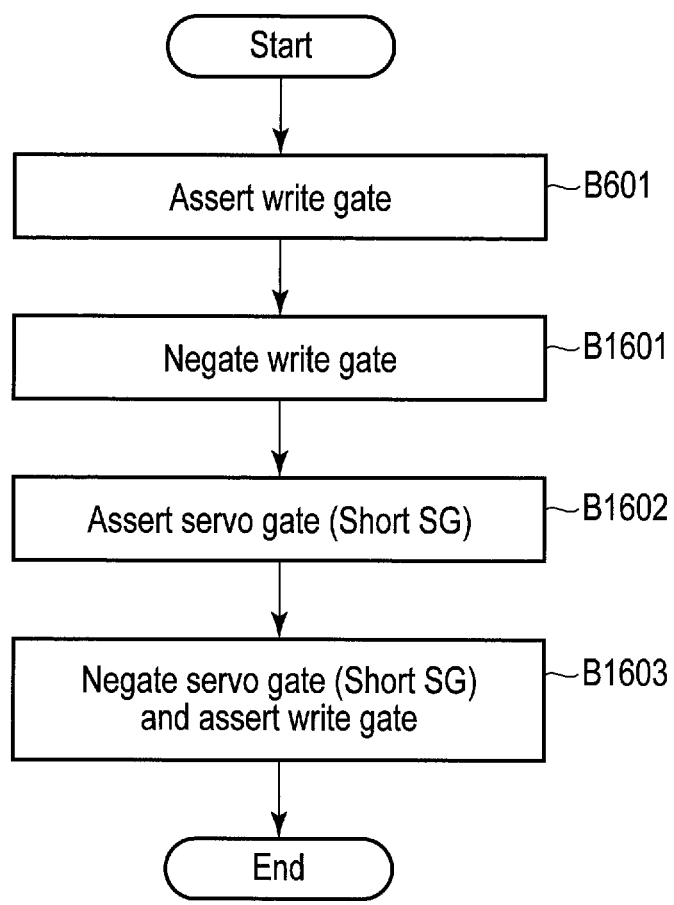
F I G. 16

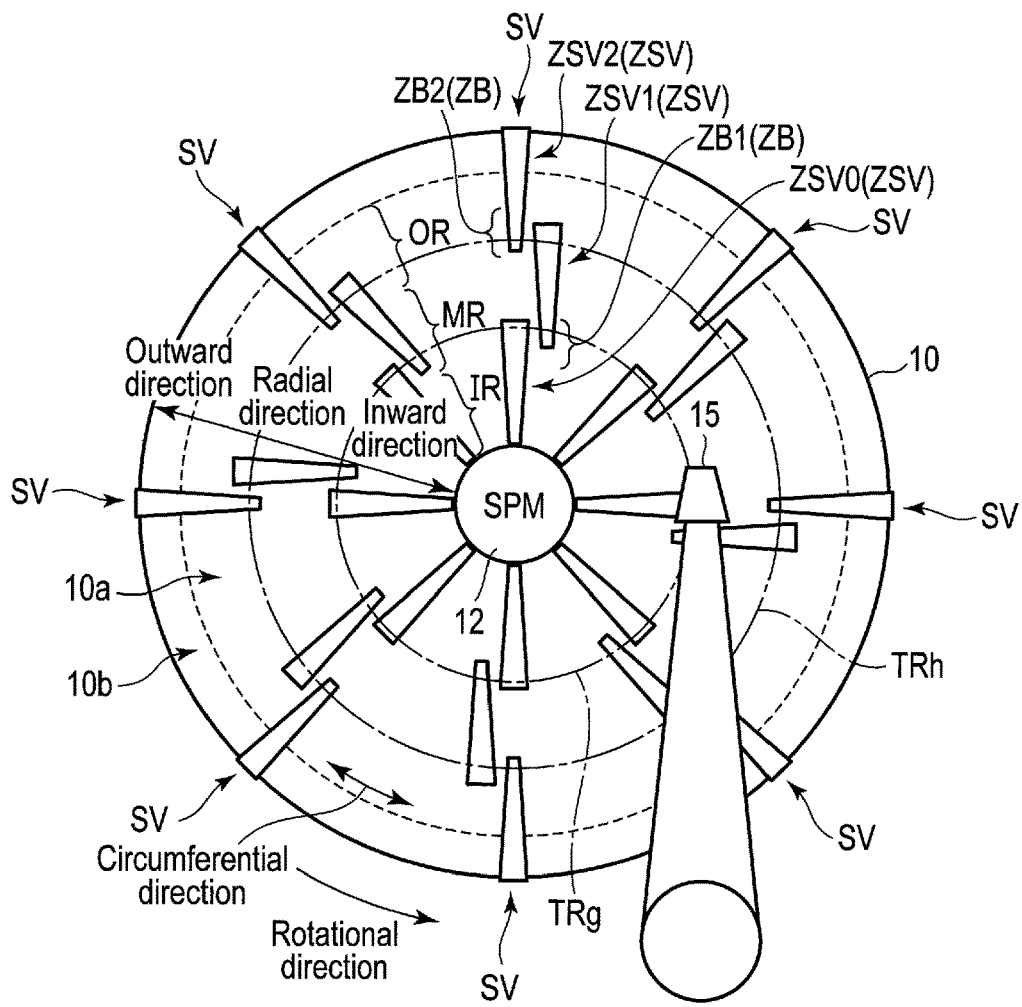
F I G. 17
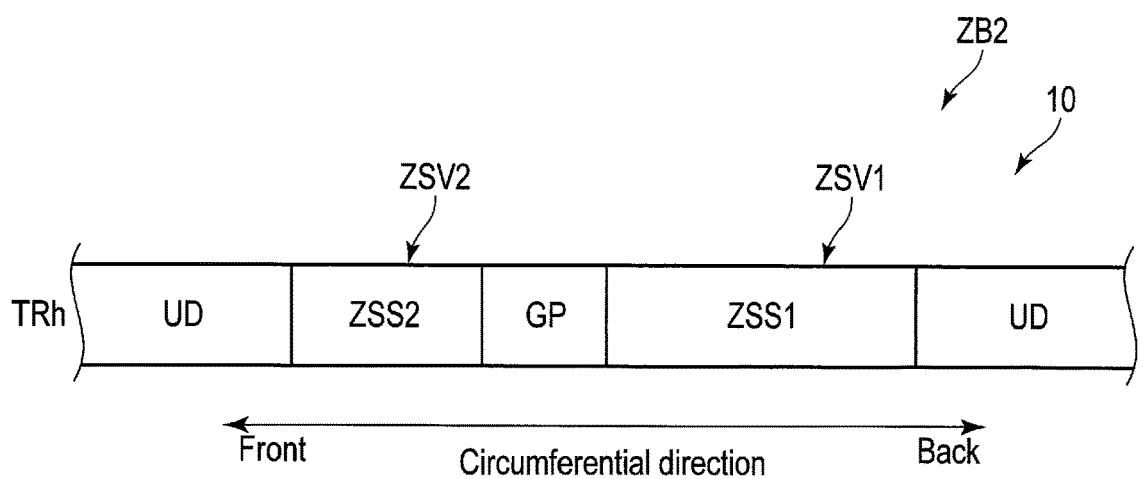
F I G. 18

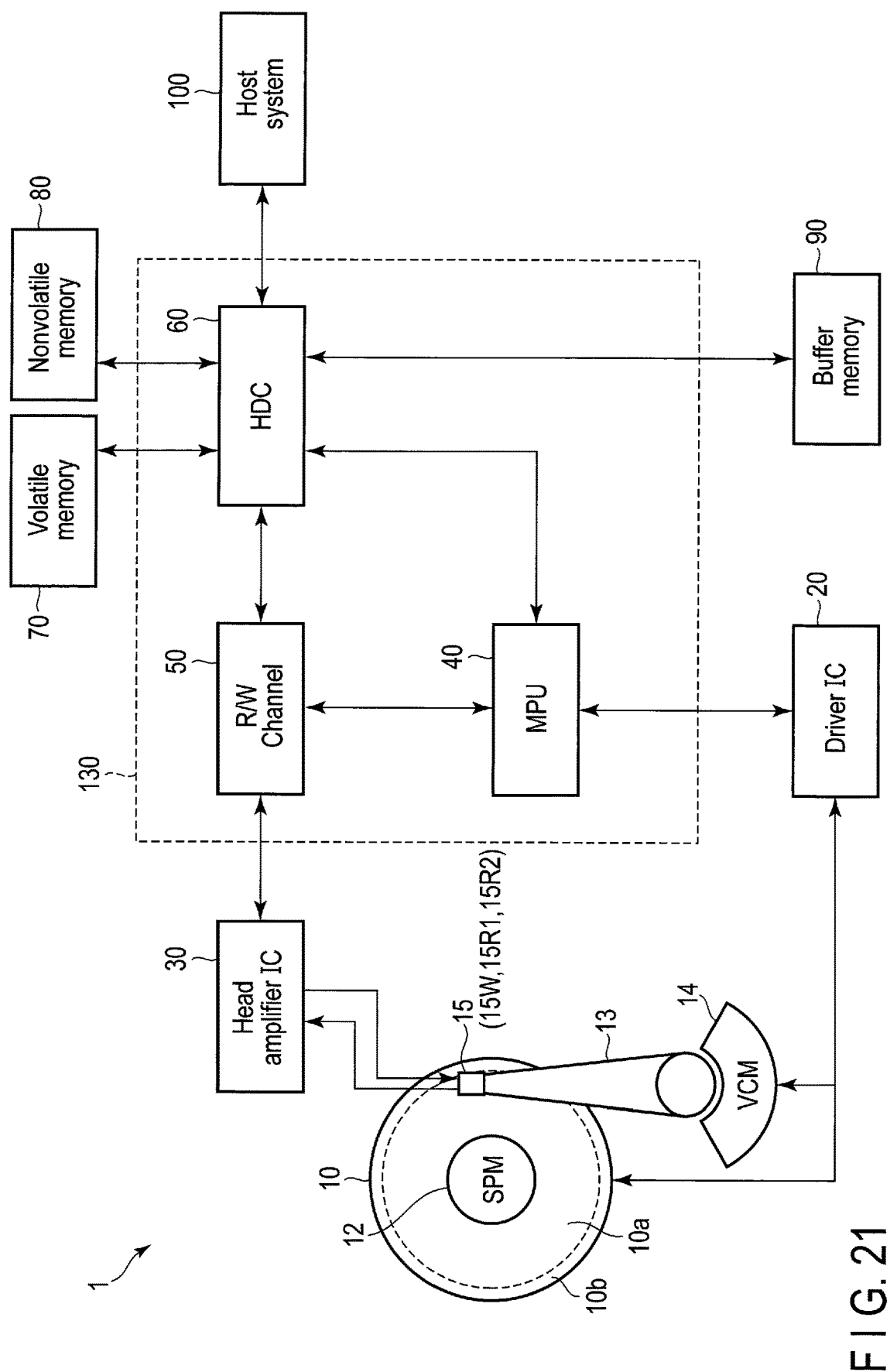
F I G. 21

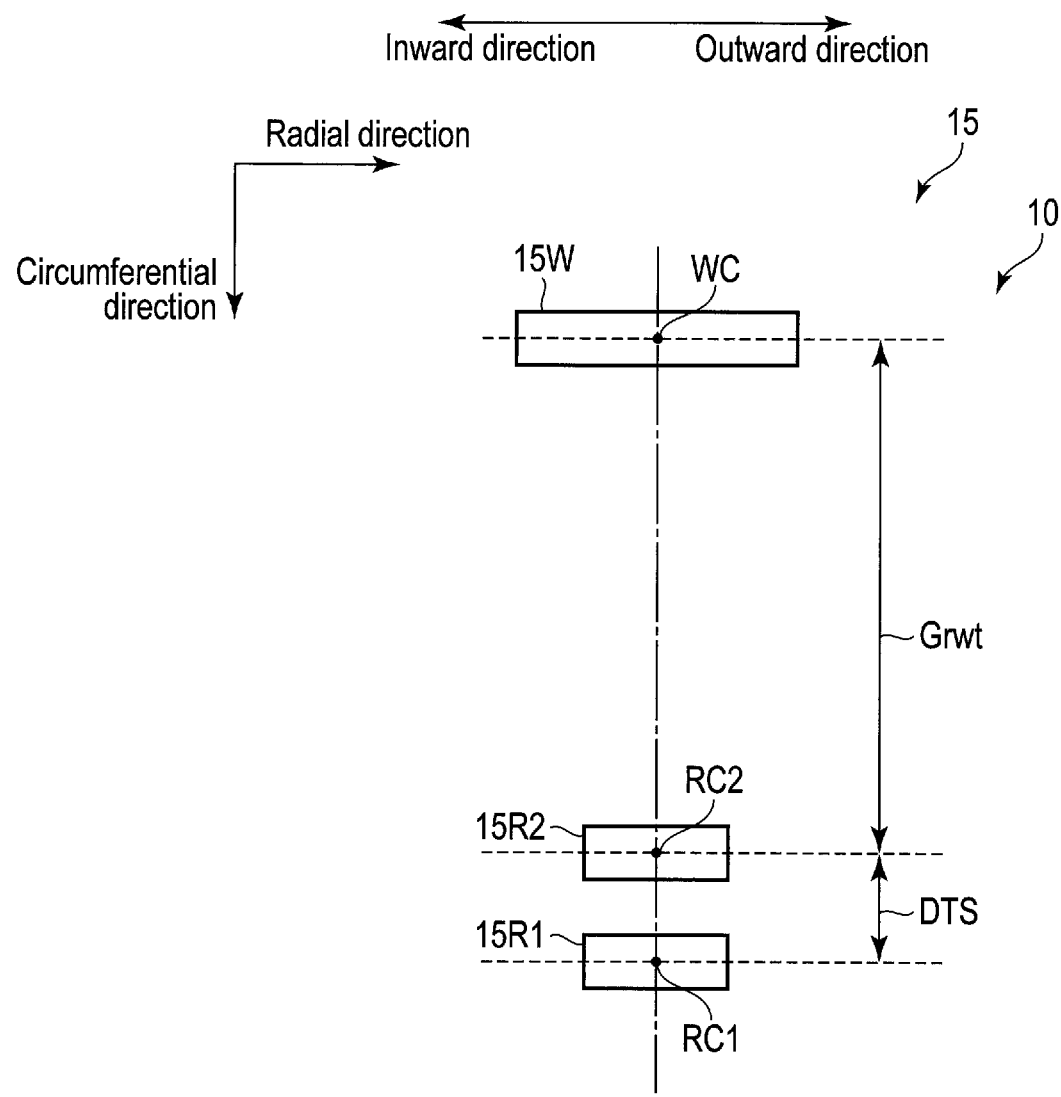
F I G. 22

MAGNETIC DISK DEVICE AND SERVO READ PROCESSING METHOD

CROSS-REFERENCE TO RELATED APPLICATIONS

This application is based upon and claims the benefit of priority from Japanese Patent Application No. 2019-163225, filed Sep. 6, 2019, the entire contents of which are incorporated herein by reference.

FIELD

Embodiments described herein relate generally to a magnetic disk device and a servo read processing method.

BACKGROUND

Techniques of improving data format efficiency on a magnetic disk (hereinafter simply referred to as a disk) and increasing regions where data can be written have been developed. Examples of the techniques of improving the data format efficiency and increasing regions where the data are writable includes a read processing technique (short servo mode) of reading a servo sector in a circumferential length of a disk shorter than a circumferential length of a disk of a servo sector reading in general read processing, and a technique of allowing the read processing of the servo sector while writing data on the disk. A magnetic disk having the read processing technique of reading the servo sector in the short servo mode does not read servo data such as a preamble, a servo mark, a gray code, and a post code, but reads burst data, in several servo sectors of a plurality of servo sectors arranged in the circumferential direction of a disk, positions the head, and executes write processing and read processing. A magnetic disk device having a technique of allowing read processing of a servo sector during writing data onto a disk executes read processing of parts of the servo data such as the preamble, the servo mark, the gray code, the burst data, and the post code before stopping the write processing by allowing the read processing of the servo sector during writing the data onto a disk.

BRIEF DESCRIPTION OF THE DRAWINGS

FIG. 1 is a block diagram showing a configuration of a magnetic disk device according to a first embodiment.

FIG. 3 is a schematic diagram showing an example of arrangement of a servo sector, according to the first embodiment.

FIG. 6 is a flowchart showing an example of a servo read processing method according to the first embodiment.

FIG. 8 is a schematic diagram showing an example of arrangement of a short servo sector, according to the second embodiment.

FIG. 10 is a diagram showing an example of read processing of a particular short servo sector of a particular track.

FIG. 13 is a flowchart showing an example of a servo read processing method according to the second embodiment.

FIG. 16 is a flowchart showing an example of a servo read processing method according to modified example 1.

FIG. 17 is a schematic diagram showing an example of arrangement of a servo region, according to a third embodiment.

FIG. 18 is a schematic diagram showing an example of data array in a circumferential direction of a zone servo boundary shown in FIG. 17.

FIG. 21 is a block diagram showing a configuration of a magnetic disk device of a fourth embodiment.

FIG. 22 is a schematic diagram showing an example of arrangement of a read head, according to the fourth embodiment.

DETAILED DESCRIPTION

Figure 2:
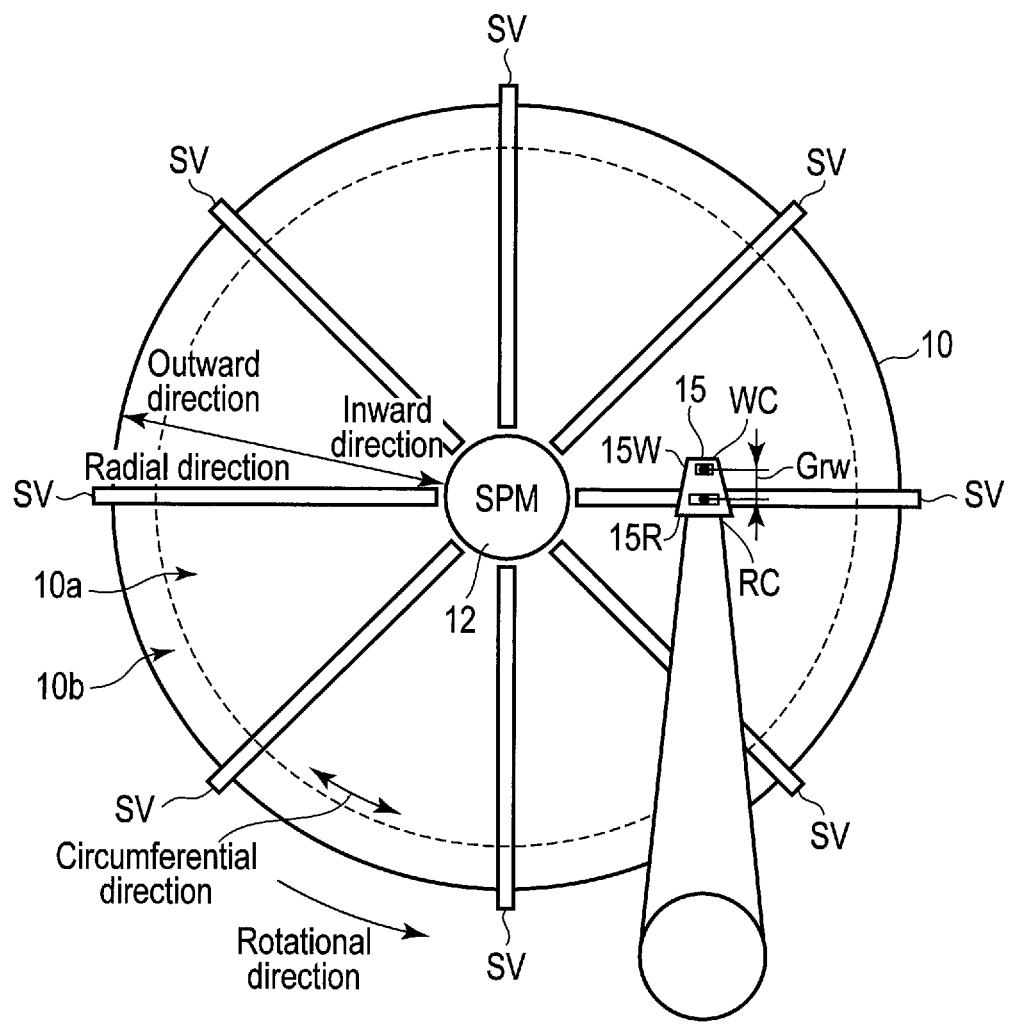
FIG. 2 is a schematic diagram showing an example of arrangement of a head relative to a disk, according to the first embodiment.

In general, according to one embodiment, a magnetic disk device, comprising: a disk including a first servo sector including a first preamble, a first servo mark, a first gray code, and first burst data; a head including a write head which writes data to the disk and a read head which reads data from the disk; and a controller which stops write processing, based on a write mask gate different from a first servo gate executing read processing of the first servo sector and a write gate executing the write processing to the disk.

Hereinafter, embodiments will be described hereinafter with reference to the accompanying drawings. The drawings merely show examples and do not limit the scope of invention.

First Embodiment

FIG. 1 is a block diagram showing a configuration of a magnetic disk device 1 according to a first embodiment.

The magnetic disk device 1 comprises a head-disk assembly (HDA) which will be described later, a driver IC 20, a head amplifier integrated circuit (hereinafter called a head amplifier IC or a preamplifier) 30, a volatile memory 70, a nonvolatile memory 80, a buffer memory (buffer) 90, and a system controller 130 composed of a single-chip integrated circuit. In addition, the magnetic disk device 1 is connected to a host system (hereinafter simply called a host) 100.

The HDA includes a magnetic disk (hereinafter called a disk) 10, a spindle motor (hereinafter called SPM) 12, an arm 13 on which a head 15 is mounted, and a voice coil motor (hereinafter called VCM) 14. The disk 10 is attached to the SPM 12 and rotated by driving the SPM 12. The arm 13 and the VCM 14 constitute an actuator. The actuator carries out control of movement of the head 15 mounted on the arm 13 to a particular position on the disk 10 by driving the VCM 14. Two or more disks 10 and heads 15 may be provided.

On the disk 10, a user data region 10a which can be used by the user and a system area 10b where information necessary for system management is written are allocated to a region where the data can be written. A direction orthogonal to a radial direction of the disk 10 is hereinafter called a circumferential direction. In addition, a particular position in the radial direction of the disk 10 is often called a radial position, and a particular position in the circumferential direction of the disk 10 is often called a circumferential position. The radial position corresponds to, for example, a track and the circumferential position corresponds to, for example, a sector. The radial position and the circumferential position are often totally called a position.

The head 15 is provided on a slider which is a main body, and comprises a write head 15W and a read head 15R mounted on the slider. The write head 15W writes data on the disk 10. The read head 15R reads data recorded on tracks on the disk 10. The write head 15W is often simply called the head 15, the read head 15R is often simply called the head 15, or the write head 15W and the read head 15R are often wholly called the head 15. A central part of the head 15 is often simply called the head 15, a central part of the write head 15W is often simply called the write head 15W, or a central part of the read head 15R is often simply called the read head 15R. The "track" is used to indicate one of a plurality of regions divided in the radial direction of the disk 10, data extending in the radial direction of the disk 10, data written on the track, and other various meanings. The "sector" is used to indicate one of a plurality of regions obtained by dividing the track in the circumferential direction, data written at a particular position of the disk 10, data written in the sector, and other various meanings. In addition, a width in the radial direction of a particular track is called a track width, and a central position of the track width of a particular track is called a track center.

FIG. 2 is a schematic diagram showing an example of arrangement of the head 15 relative to the disk 10, according to the present embodiment. As shown in FIG. 2, a direction toward an outer periphery of the disk 10 in the radial direction is called an outward direction (outside), and a direction opposite to the outward direction is called an inward direction (inside). Furthermore, as shown in FIG. 2, a direction of rotation of the disk 10, in the circumferential direction, is called a rotational direction. In the example shown in FIG. 2, the rotational direction is illustrated as a counterclockwise direction, but may be an opposite (clockwise) direction.

The disk 10 includes a plurality of servo regions SV. The servo regions SV radially extend in the radial direction of the disk 10 to be discretely arranged and spaced apart with particular intervals in the circumferential direction. In the following descriptions, one servo region SV on a particular track is often called "servo sector". The servo region SV is often called servo sector SV. The servo sector includes servo data. The "servo data written in the servo sector" is often called "servo sector". In addition, data other than the servo data written in the user data region 10a other than the servo sector is often called user data.

The head 15 is provided with a write head 15W and a read head 15R remote from each other in a particular distance (hereinafter often called a read/write gap) Grw in the circumferential direction. The read/write gap Grw corresponds to a distance in the circumferential direction between a central part WC of the write head 15W and a central part RC of the read head 15R. In the example shown in FIG. 2, the head 15 is not inclined outwardly or inwardly (in a state where a skew angle is zero degrees), but may be inclined outwardly or inwardly. In this case, the read/write gap corresponds to a distance in the circumferential direction between the write head 15W and the read head 15R, at the head 15 inclined outwardly or inwardly.

FIG. 3 is a schematic diagram showing an example of arrangement of a servo sector SS, according to the present embodiment. FIG. 3 shows a particular servo sector SS written on a particular track TRn of the disk 10. As shown in FIG. 3, a direction toward a distal end of a front arrow, in the circumferential direction, is called forward (for forward direction), and a direction toward a distal end of a rear arrow is called rearward (or rearward direction). For example, a direction of reading/writing (read/write direction) in the circumferential direction corresponds to a direction toward the forward direction or the rearward direction. The read/write direction corresponds to, for example, a direction opposite to the rotational direction shown in FIG. 2.

The servo sector SS includes the servo data, for example, the preamble, the servo mark, the gray code, PAD, the burst data, and the post code. The servo sector SS may not include the post code. In the servo sector SS, Preamble, the servo mark, the gray code, the PAD, the burst data, and the post code are sequentially arranged in this order from the front side to the back side in the circumferential direction. FIG. 3 shows a circumferential length (hereinafter often simply called a length) ASL of the servo sector SS, a length SVL that is a sum of the preamble, the servo mark, and gray code, and a length PCL of the post code. The preamble includes preamble information for synchronizing with a regenerated signal of a servo pattern composed of the servo mark, the gray code, and the like. The servo mark includes servo mark information indicating the start of the servo pattern. The gray code is composed of an address (cylinder address) of a particular track and an address of a servo sector of a particular track. The burst data is the data (relative position data) used to detect displacement (position error) in the radial direction and/or circumferential direction of the head 15 with respect to a track center of a particular track, and composed of patterns repeating in a particular cycle. The PAD includes PAD information of synchronous signals such as gap and servo AGC. The burst data is written in a data pattern in which the phase of the burst data is inverted at 180 degrees in a servo track cycle in the radial direction of the disk 10. The servo track (servo cylinder) corresponds to the track which is subjected to write processing or read processing by commands from the host 100 or the like. The burst data is used to acquire, for example, the position (hereinafter often called a head position) in the radial direction and/or circumferential direction of the head 15 on the disk 10. The burst data includes, for example, N burst and Q burst. The N burst and the Q burst are written in data patterns in which phases are shifted from each other at 90 degrees in the radial direction of the disk 10. The post code includes a path (hereinafter often called a target path) that is the target of the head 15 concentrically arranged with the disk 10 caused by a shake (repeated run out (RRO)) synchronized with the rotation of the disk 10 when servo data is written to the disk, for example, data (hereinafter called RRO correction data) or the like for correcting an error caused by distortion of the track for the track center. In the following descriptions, for the sake of convenience of explanation, an error resulting from distortion of the track to the target path caused by RRO is often simply called RRO.

The driver IC 20 controls drive of the SPM 12 and the VCM 14 under control of a system controller 130 (more specifically, MPU 40 to be described later).

The head amplifier IC (preamplifier) 30 comprises a read amplifier and a write driver. The read amplifier amplifies the read signal that is read from the disk 10 and outputs the read signal to the system controller 130 (more specifically, a read/write (R/W) channel 50 to be described later). The write driver outputs a write current corresponding to a signal output from the R/W channel 50 to the head 15.

The volatile memory 70 is a semiconductor memory where the stored data is lost when power supply is cut off. The volatile memory 70 stores data necessary for processing at each of units of the magnetic disk device 1. The volatile memory 70 is, for example, a dynamic random access memory (DRAM) or a synchronous dynamic random access memory (SDRAM).

The nonvolatile memory 80 is a semiconductor memory for recording the data that is secured even if power supply is cut off. The nonvolatile memory 80 is, for example, a NOR or NAND flash read-only memory (flash ROM: FROM).

The buffer memory 90 is a semiconductor memory that temporarily records data transmitted and received between the magnetic disk device 1 and the host 100 or the like. The buffer memory 90 may be constituted integrally with the volatile memory 70. The buffer memory 90 is, for example, DRAM, a static random access memory (SRAM), SDRAM, a ferromagnetic random access memory (feRAM), a magnetoresistive random access memory (MRAM), or the like.

The system controller (controller) 130 is implemented using, for example, a large-scale integrated circuit (LSI) called system-on-a-chip (SoC) formed by integrating a plurality of elements on a single chip. The system controller 130 includes a microprocessor (MPU) 40, a read/write (R/W) channel 50, and a hard disk controller (HDC) 60. The system controller 130 is electrically connected to, for example, the driver IC 20, the head amplifier IC 30, the volatile memory 70, the nonvolatile memory 80, the buffer memory 9, and the host 100.

The MPU 40 is a main controller which controls each of units of the magnetic disk device 1. The MPU 40 controls the VCM 14 via the driver IC 20, and executes servo control to carry out positioning of the head 15. In addition, the MPU 40 controls the SPM 12 via the driver IC 20 to allow the disk 10 to be rotated. The MPU 40 controls an operation of writing data to the disk 10 and selects a storage destination of the write data. In addition, the MPU 40 controls an operation of reading data from the disk 10, and also controls processing of the read data. The MPU 40 is connected to each unit of the magnetic disk device 1. The MPU 40 is electrically connected to, for example, the driver IC 20, the R/W channel 50, the HDC 60, and the like.

In accordance with instructions from the MPU 40, the R/W channel 50 executes signal processing, for example, modulation, demodulation, encoding, and decoding of the read data transferred from the disk 10 to the host 100 and the write data transferred from the host 100. The R/W channel 50 has a circuit or a function for measuring the signal quality of the read data. The R/W channel 50 detects various gates, for example, a write gate (WG) corresponding to a signal to write the data, a read gate (RG) corresponding to a signal to read the data, a servo gate (SG) corresponding to a signal to read the servo, a write mask gate corresponding to a signal to stop the data write processing, and the like. For example, the R/W channel 50 executes the signal processing of the write data in response to the write gate, the signal processing of the read data in response to the read gate, and the signal processing of the servo data in response to the servo gate. In addition, the R/W channel 50 outputs a write fault signal (hereinafter often called a fault signal) to stop write to the HDC 60 and immediately stops the signal processing of the write data. For example, when the write gate and the write mask gate output from the HDC 60 to be described later are asserted (active, valid or ON), the R/W channel 50 outputs the fault signal to the HDC 60 and immediately stops the signal processing of the write data. In other words, when the write gate and the write mask gate output from HDC 60 to be described later are asserted, the R/W channel 50 stops the write processing. The R/W channel 50 allows the write gate and the servo gate output from the HDC 60 to be described later to be asserted for a particular time. In other words, the R/W channel 50 allows the read processing of the servo data (i.e., processing of demodulating the servo data from the read signal input from the head amplifier IC 30, hereinafter often called servo read) and the write processing of the data to the disk 10 (i.e., processing of outputting the write data to the head amplifier IC 30) to be executed simultaneously for a particular time. The R/W channel 50 is electrically connected to, for example, the head amplifier IC 30, the MPU 40, the HDC 60, and the like. For example, the R/W channel 50 is electrically connected to, for example, the HDC 60 via interconnects WR. The head amplifier IC 30 comprises a function of simultaneously executing processing of outputting to the write head 15W the write data input from the R/W channel 50 as a write current, and processing of amplifying a read signal regenerated by the read head 15R and outputting the read signal to the R/W channel 50.

The HDC 60 controls data transfer between the host 100 and the R/W channel 50 in accordance with directions from the MPU 40. In accordance with the directions from the MPU 40, the HDC 60 outputs various gates, for example, a write gate, a read gate, a servo gate, a write mask gate, and the like to the R/W channel 50. The HDC 60 is electrically connected to, for example, the MPU 40, the R/W channel 50, the volatile memory 70, the nonvolatile memory 80, the buffer memory 90, and the like.

Figure 4:
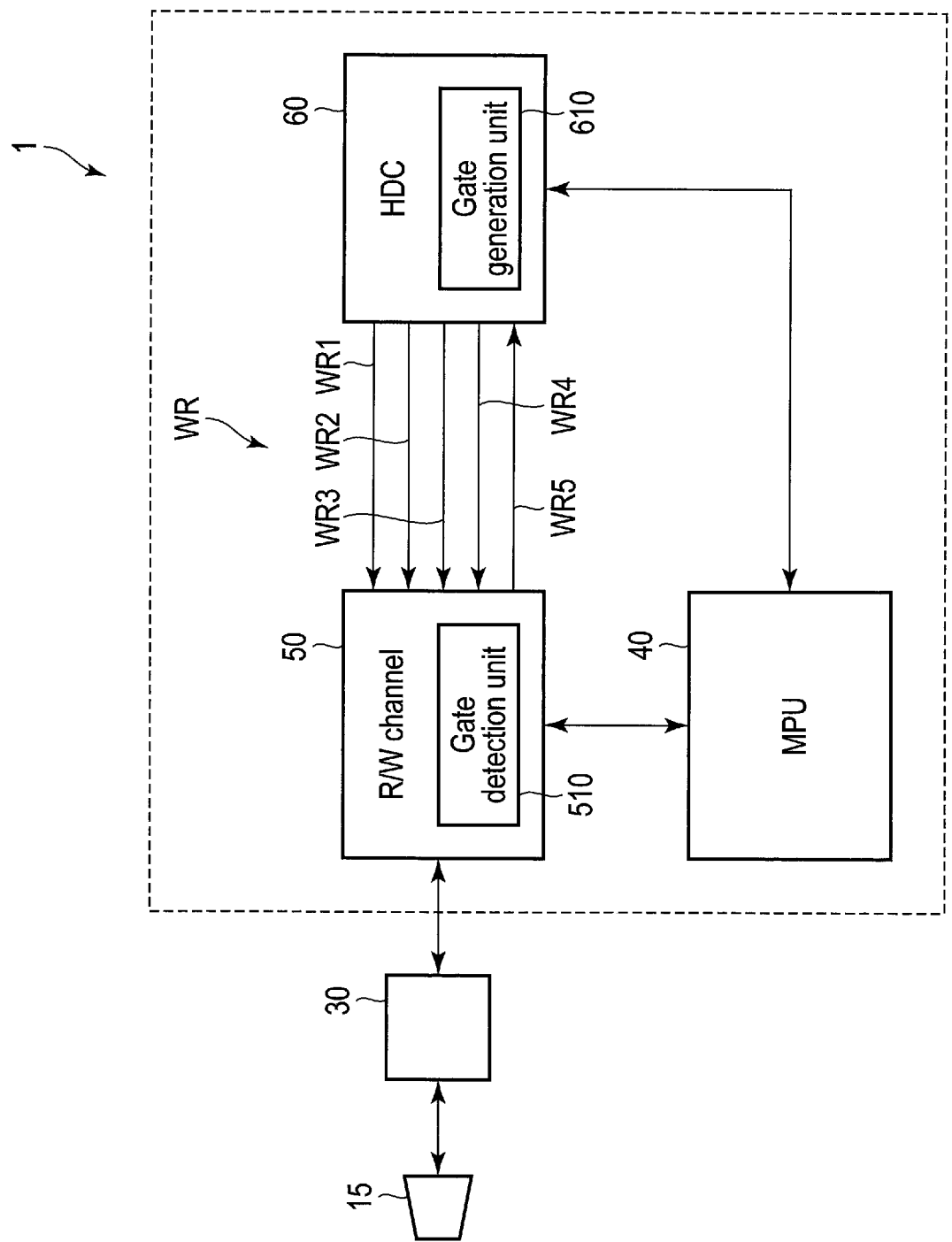
FIG. 4 is a diagram showing an example of inputs and outputs of various gates, according to the first embodiment.

FIG. 4 is a diagram showing an example of inputs and outputs of various gates, according to the present embodiment.

In the example illustrated in FIG. 4, the interconnects WR includes interconnects WR1, WR2, WR3, WR4, and WR5. The interconnects WR1 to WR5 may be physical interconnects or signal communication paths. For example, the interconnect WR1 indicates an interconnect or communication path for transferring the servo gate (SG) from the HDC 60 to the R/W channel 50, the interconnect WR2 indicates an interconnect or communication path for transferring the write gate (WG) from the HDC 60 to the R/W channel 50, the interconnect WR3 indicates an interconnect or communication path for transferring the read gate (RG) from the HDC 60 to the R/W channel 50, the interconnect WR4 indicates an interconnect or communication path for transferring the write mask gate from the HDC 60 to the R/W channel 50, and the interconnect WR5 indicates an interconnect or communication path for transferring the fault signal to the R/W channel 50.

The R/W channel 50 includes a gate detection unit 510. The gate detection unit 510 detects whether various gates, for example, the write gate, the read gate, servo gate, the write mask gate or the like is in a asserted (active, valid or ON) state or a negated (inactive, invalid or OFF) state. For example, when detecting a state that the write gate and the write mask gate are asserted, the gate detection unit 510 outputs a fault signal to the HDC 60 via the interconnect WR5 and stops the signal processing of the write data. When detecting a state that the write gate and the servo gate are asserted, the gate detection unit 510 continues the signal processing of the write data for a particular time without outputting the fault signal to the HDC 60 for a particular time. In other words, the gate detection unit 510 allows the write gate and the servo gate to be asserted simultaneously for a particular time. For example, when the write gate is asserted, in a circumferential direction of a particular track, the gate detection unit 510 allows the write gate and the servo gate to be asserted simultaneously for a period from the time when the servo gate becomes asserted to the time when the write head 15W overwrites immediately before the servo sector SS or in a particular range of the servo sector SS. The gate detection unit may be provided inside the HDC 60.

The HDC 60 includes a gate generation unit 610. In accordance with commands from the host 100 or directions from the MPU 60, the gate generation unit 610 generates various gates, for example, a write gate, a read gate, a servo gate, a write mask gate, and the like. For example, the gate generation unit 610 outputs the servo gate to the R/W channel 50 via the interconnect WR1, outputs the write gate to the R/W channel 50 via the interconnect WR2, outputs the read gate to the R/W channel 50 via the interconnect WR3, and outputs the write mask gate to the R/W channel 50 via the interconnect WR4. In addition, the fault signal is input to the gate generation unit 610 via the interconnect WR5.

Figure 5:
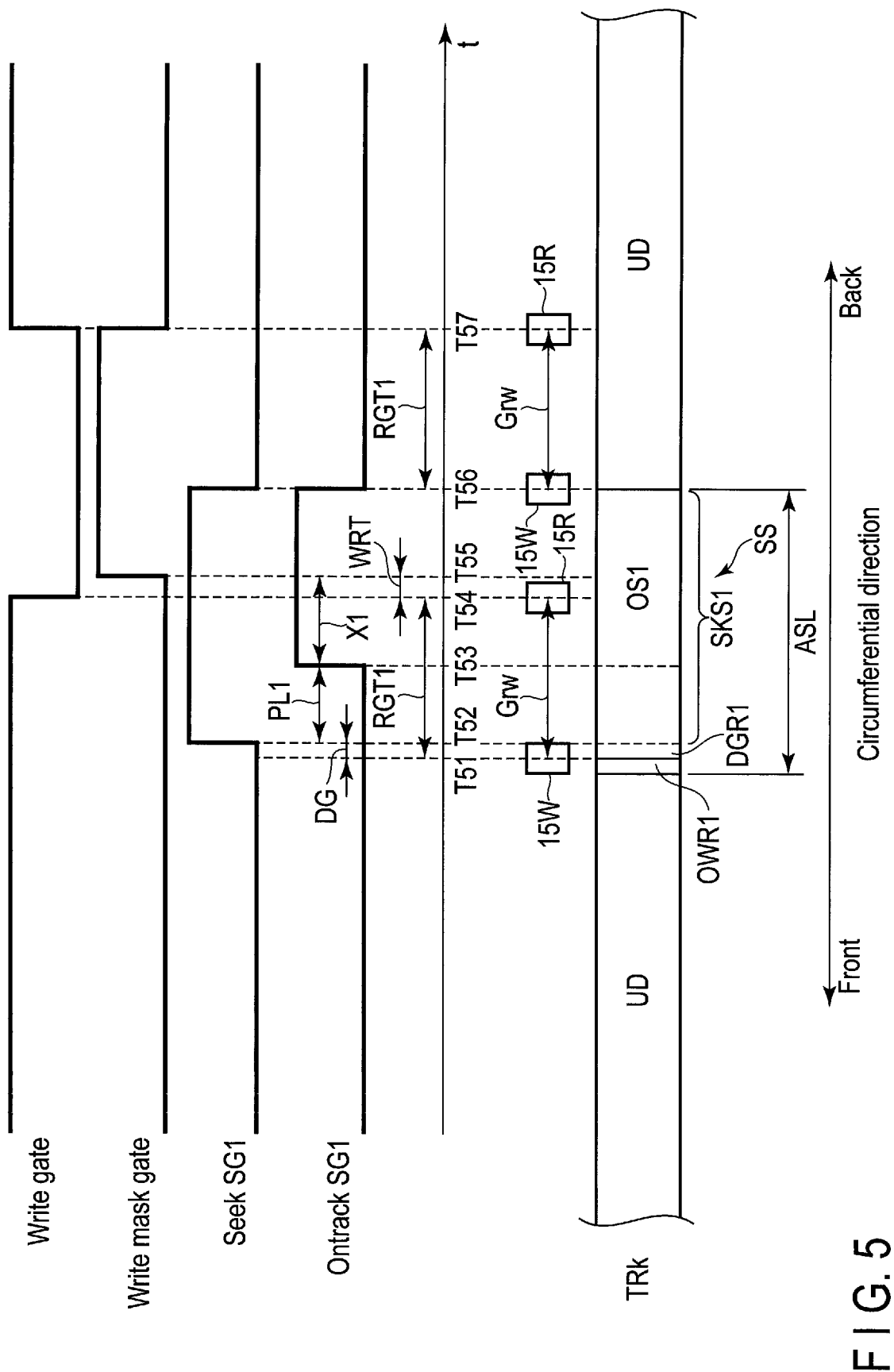
FIG. 5 is a schematic diagram showing an example of various gates and arrangement of the head.

FIG. 5 is a schematic diagram showing an example of various gates and arrangement of the head 15. FIG. 5 shows the write gate, the write mask gate, the seek servo gate (Seek SG1) that is equivalent to the servo gate corresponding to the servo read before reaching a particular track, and an ontrack servo gate (Ontrack SG1) that is equivalent to the servo gate corresponding to the servo gate in a case where the head 15 reaches a particular track and locates on the track to write/read the data. These gates are asserted at rise and negated at fall. In FIG. 5, a horizontal axis of these gates represents time t. On the horizontal axis of FIG. 5, timings T51, T52, T53, T54, T55, T56, and T57 are shown. Timing T52 corresponds to the time after timing T51, timing T53 corresponds to the time after timing T52, timing T54 corresponds to the time after timing T53, timing T55 corresponds to the time after timing T54, timing T56 corresponds to the time after timing T55, and timing T57 corresponds to the time after timing T56. Timing T54 corresponds to the timing at which the write gate is negated, timing T51 corresponds to the timing of starting degauss when the write gate is negated at timing T54, and timing T52 corresponds to the timing of ending the degauss when the write gate is negated at timing T54 and the timing of asserting the seek SG1. In this case, degauss indicates that an attenuating recording current is supplied from the head amplifier IC 30 to the write head 15W for a short time when the write processing is stopped. The timing of asserting the seek SG1 may be in a range after timing T52 and before timing T53. Timing T53 corresponds to the timing at which the ontrack SG1 asserts, timing T55 corresponds to the timing at which the write mask gate asserts, timing T56 corresponds to the timing at which the seek SG1 negates and the timing at which ontrack SG1 negates, and timing T57 corresponds to the timing at which the write gate asserts and the timing at which the write mask gate negates.

A differential value between timings T51 and T52 corresponds to the time of degauss (hereinafter often called a degauss time) DG, a differential value between timings T52 and T53 corresponds to the differential time (hereinafter often called an assert differential time) PL1 between the time of assertion of the seek SG1 and the time of assertion of the ontrack SG1, a differential value between timings T53 and T55 corresponds to the differential time (hereinafter often simply called a time) X1 between the time of assertion of the ontrack SG1 and the time of assertion of the write mask gate, a differential value between timings T54 and T55 corresponds to the differential time WRT between the time for negating the write gate and the time of assertion of the write mask gate, and each of a differential value between timings T51 and T54 and a differential time between timings T56 and T57 corresponds to the time (hereinafter often called a read/write gap time) RGT1 corresponding to the read/write gap. The differential time WRT corresponds to the time to transition from the write processing to the servo read processing. The differential time WRT is often called a transition time WRT in the following descriptions.

The seek servo gate, for example, seek SG1 is asserted to be readable from an initial particular range of the servo sector SS since the preamble needs to be read to be longer when the head 15 seeks from the other track to a particular track. When putting the head 15 on a particular track to write/read the data, the ontrack servo gate, for example, the ontrack SG1 is asserted to be readable from a particular range after the initial particular range of the servo sector SS since the preamble does not need to be entirely read. That is, the timing at which the seek servo gate, for example, the seek SG1 is asserted to the servo sector SS is earlier than the timing at which the ontrack servo gate, for example, the ontrack SG1 is asserted to the servo sector SS. In addition, the time in which the seek servo gate, for example, the seek SG1 is asserted is longer than the time in which the ontrack servo gate, for example, the ontrack SG1 is asserted. In other words, the length of the servo sector SS read by the seek servo gate, for example, the seek SG1 is longer than the length of the servo sector SS read by the ontrack servo gate, for example, the ontrack SG1.

FIG. 5 also shows track TRk. On the track TRk, user data UD and the servo sectors SS are arranged alternately. In the example shown in FIG. 5, the user data UD and the servo sector SS are adjacent in the circumferential direction and do not include a gap or the like interposed therebetween. The term "adjacent" indicates that data, objects, regions, space and the like are arranged to be in contact and also includes that they are arranged and spaced apart by a particular interval. The servo sector SS includes an overwrite region OWR1 and a degauss region DGR1. The overwrite region OWR1 is the region where a servo region in which the servo read is not executed, of the servo region written at the servo write, is overwritten by the user data. The degauss region DGR1 is the region where particular data is overwritten by degauss. For example, the overwrite region OWR1 and the degauss region DGR1 correspond to the region where the preamble is written before particular data is overwritten. In the servo sector SS, the region excluding the overwrite region OWR1 and the degauss region DGR1 is called a seek servo sector SKS1. The seek servo sector SKS1 corresponds to servo data necessary for the servo read corresponding to the seek SG1. The seek servo sector SKS1 includes an ontrack servo sector OS1. The ontrack servo sector OS1 corresponds to servo data necessary for the servo read corresponding to the ontrack SG1. The length of the ontrack servo sector OS1 is shorter than the length of the seek servo sector SKS1. The region obtained by excluding the ontrack servo sector OS1 from the seek servo sector SKS1 corresponds to, for example, the region where the preamble is recorded. FIG. 5 shows a read head 15R for the track TRk at timing T54 at which the write gate is negated, a write head 15W corresponding to the read head 15R at timing T54, a read head 15R for the track TRk at timing T57 at which the write gate is asserted, and a write head 15W corresponding to the read head 15R at timing T57.

The system controller 130 negates the write gate so as not to write particular data to the servo sector SS, for example, the seek servo sector SKS1 at the servo read corresponding to the seek SG1 and the ontrack SG1. The system controller 130 asserts the write mask gate so as not to write particular data to the seek servo sector SKS1 at the servo read corresponding to the seek SG1 and the ontrack SG1. For example, the system controller 130 asserts the write mask gate by referring to assertion of the ontrack SG1. In the example shown in FIG. 5, the system controller 130 asserts the write mask gate at timing T55 delayed by time X1 from timing T53 for assertion of the ontrack SG1. For example, the system controller 130 calculates differential time X1 (=X) in the following equations.

$$X = RGT + WRT - DG - PL \quad (1)$$

$$X1 = RGT1 + WRT - DG - PL1 \quad (2)$$

X corresponds to a differential time between the time for assertion of the servo gate, for example, ontrack SG1 and the time for assertion of the write mask gate, RGT indicates a read/write gap time, WRT indicates a transition time from the end of write to the start of servo read, DG indicates a degauss time, and PL indicates a maximum value of the assertion differential time between the seek servo gate and the ontrack servo gate.

The system controller 130 may calculate, for example, the time X, the read/write gap time RGT, and the like for each head and for each zone of the disk 10 by tests or the like and record them in a particular recording region, for example, the system area 10b of the disk 10 or the nonvolatile memory 80.

The system controller 130 asserts the write gate so as not to overwrite particular data to the servo sector SS, for example, the ontrack servo sector OS1 after ending the servo read corresponding to the seek SG1 and the ontrack SG1. In addition, the system controller 130 negates the write mask gate so as not to overwrite particular data to the ontrack servo sector OS1 after ending the servo read corresponding to the seek SG1 and the ontrack SG1. For example, the system controller 130 asserts the write gate at timing T57 delayed by the read/write gap time RGT from timing T56 at which the servo read corresponding to the seek SG1 and the ontrack SG1 is ended. In addition, for example, the system controller 130 negates the write mask gate at timing T57 delayed by the read/write gap time RGT from timing T56 at which the servo read corresponding to the seek SG1 and the ontrack SG1 is ended.

In the example shown in FIG. 5, when seeking the head 15 from the other track to the track TRk and executing the servo read, the system controller 130 asserts the seek SG1 in a range from timing T52 to timing T53 and starts the servo read processing of the seek servo sector SKS1 during seek before reaching the track TRk. The system controller 130 asserts the write mask gate at timing T55. After asserting the write mask gate at timing T55, the system controller 130 negates the seek SG1 and ends the servo read of the seek servo sector SKS1 (servo sector SS) at timing T56. After ending the servo read of the seek servo sector SKS1 at timing T56, the system controller 130 negates the write mask gate, asserts the write gate, and starts the write processing of user data UD immediately after the servo sector SS, at timing T57.

In the example shown in FIG. 5, the system controller 130 asserts the ontrack SG1 and starts the servo read processing of the ontrack servo sector OS1 at timing T53, when locating on the track TRk and writing/reading the user data to execute the servo read. After starting the servo read processing of the ontrack servo sector OS1 at timing T53, the system controller 130 continues asserting the write gate and allows the write gate and the ontrack SG to be asserted simultaneously until overwriting the user data to the overwrite region OWR1. The system controller 130 negates the write gate, overwrites the user data to the overwrite region OWR1, and stops the write processing, at timing T54. After stopping the write processing at timing T54, the system controller 130 asserts the write mask gate at timing T55 that corresponds to the time delayed by time X1 from timing T53 for assertion of ontrack SG1. After asserting the write mask gate at timing T55, the system controller 130 negates the ontrack SG1 and ends the servo read of the ontrack servo sector OS1 (servo sector SS) at timing T56. After ending the servo read of the ontrack servo sector OS1 (servo sector SS) at timing T56, the system controller 130 negates the write mask gate, asserts the write gate, and starts the write processing of user data UD immediately after the servo sector SS, at timing T57.

FIG. 6 is a flowchart showing an example of a servo read processing method during write after completing seek, according to the present embodiment.

The system controller 130 asserts the write gate and starts write processing on a particular track of the disk 10 (B601) and, if reaching the servo sector SS during the write processing on a particular track, asserts the servo gate and starts the servo read processing of the servo sector SS (B602). For example, when executing the servo read of the servo sector SS upon locating on a particular track and writing the user data, the system controller 130 asserts the ontrack servo gate such that the ontrack servo sector OS1 of the servo sector SS can be read. The system controller 130 negates the write gate to stop the write processing on a particular track of the disk 10 during asserting the servo gate (B603), and asserts the write mask gate (B604). For example, the system controller 130 allows the write gate and the ontrack SG1 to be asserted simultaneously until overwriting the user data to the overwrite region OWR1 of the servo sector SS, and stops the write processing at timing of overwriting the user data on the overwrite region OWR1. The system controller 130 asserts the write mask gate at the timing delayed by time X1 from the timing of assertion of the ontrack SG1, and confirms whether the write gate is not asserted simultaneously during the write mask gate assert. The system controller 130 negates the servo gate and ends the servo read processing of the servo sector SS (B605). For example, the system controller 130 negates the ontrack servo gate when completing the servo read of the ontrack servo sector OS1. The system controller 130 negates the write mask gate, asserts the write gate to start the write processing after the servo sector SS of a particular track (B606), and ends the processing. For example, after ending the servo read of the servo sector SS, the system controller 130 negates the write mask gate not to overwrite the servo sector SS and asserts the write gate.

According to the present embodiment, the magnetic disk device 1 asserts the write gate and starts the write processing on a particular track of the disk 10 and, if reaching the servo sector SS during the write processing on a particular track, asserts the servo gate and starts the servo read processing of the servo sector SS. The magnetic disk device 1 allows the write gate and the servo gate (ontrack SG1) to be asserted simultaneously until overwriting the user data to the overwrite region OWR1 of the servo sector SS, and stops the write processing at the timing of overwriting the user data on the overwrite region OWR1. The magnetic disk device 1 asserts the write mask gate after the transition time WRT from the timing of stopping the write processing or after time X1 from the timing of assertion of the ontrack SG1. For this reason, since the magnetic disk device 1 can improve the format efficiency of the disk 10 and detect abnormality that simultaneously asserts the write gate and the write mask gate, the magnetic disk device 1 can protect the servo data necessary for the servo control of the head 15. Therefore, the magnetic disk device 1 can improve the reliability.

Next, a magnetic disk device according to the other embodiments and modified examples will be described. In the other embodiments and modified examples, portions like or similar to those of the above-explained first embodiment are denoted by the same reference numbers or symbols and detailed descriptions are omitted.

Second Embodiment

A magnetic disk device 1 of the second embodiment is different from the first embodiment with respect to a feature of having a short servo sector with a length smaller than a normal servo sector.

Figure 7:
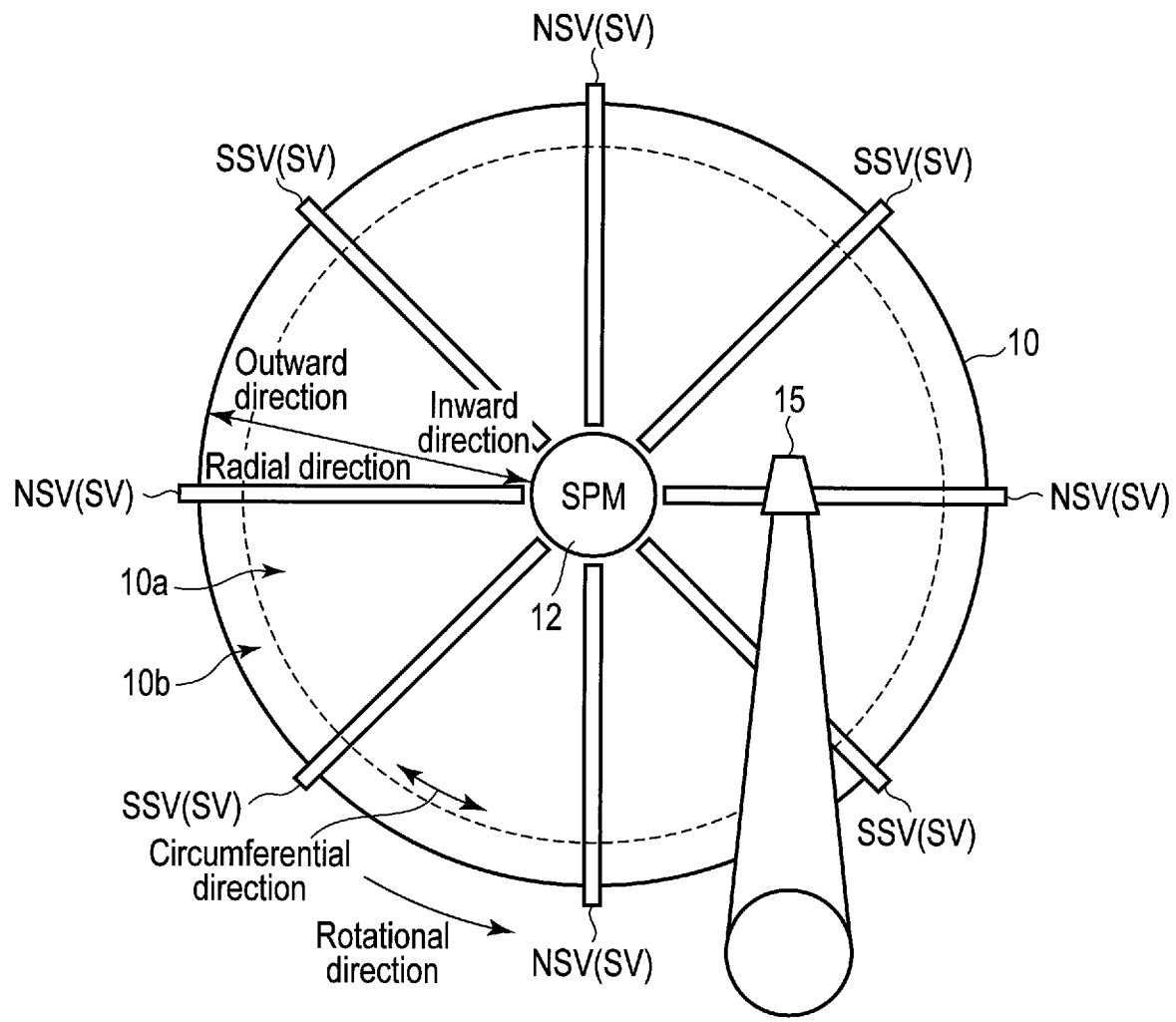
FIG. 7 is a schematic diagram showing an example of arrangement of a normal servo region and a short servo region according to a second embodiment.

FIG. 7 is a schematic diagram showing an example of arrangement of a normal servo region NSV and a short servo region SSV according to a second embodiment.

In the example shown in FIG. 7, a servo region SV includes, for example, a servo region NSV (hereinafter referred to as a normal servo region) and a servo region (hereinafter referred to as a short servo region) SSV different from the servo region NSV. In the following descriptions, one normal servo region NSV on a particular track is often called "servo sector", and one short servo region SSV on a particular track is often called "short servo sector". The normal servo region NSV is often called "normal servo sector NSV", and the short servo region SSV is often called "short servo sector SSV". The normal servo sector and the short servo sector include servo data. The "servo data written to the normal servo sector" is often called "normal servo sector", and the "servo data written to the short servo sector" is often called "short servo sector". The length of the short servo sector is shorter than the length of the normal servo sector. In the example shown in FIG. 7, the normal servo region NSV and the short servo region SSV are alternately arranged in the circumferential direction. In other words, one short servo region SSV is arranged between two sequential normal servo regions NSV, in the circumferential direction. Two or more short servo regions SSV may be arranged between two sequential normal servo regions NSV in the circumferential direction.

FIG. 8 is a schematic diagram showing an example of arrangement of a short servo sector STS, according to the second embodiment. FIG. 8 shows a particular short servo sector STS written on a particular track TRn. The normal servo sector is equal to the servo sector SS shown in FIG. 3. The normal servo sector is often hereinafter referred to as normal servo sector SS.

In the example shown in FIG. 8, the short servo sector STS includes servo data, for example, a preamble, a servo mark, a gray code, a PAD, burst data (N burst and Q burst), and an additional pattern. The short servo sector STS may not include a preamble, a servo mark, a gray code, a PAD, and an additional pattern. The preamble, the servo mark, the gray code, the PAD, the burst data, and the additional pattern are sequentially arranged in this order from the front side to the back side in the circumferential direction. The length STL of the short servo sector STS is shorter than the length ASL of the normal servo sector SS. The length of the short servo sector STS is equal to, for example, the length of the preamble of the normal servo sector SS. The length of the preamble of the short servo sector STS may be different from the length of the preamble of the normal servo sector SS. The length of the servo mark of the short servo sector STS is equal to, for example, the length of the servo mark of the normal servo sector SS. The length of the servo mark of the short servo sector STS may be different from the length of the servo mark of the normal servo sector SS. The length of the gray code of the short servo sector STS is equal to, for example, the length of the gray code of the normal servo sector SS. The length of the gray code of the short servo sector STS may be different from the length of the gray code of the normal servo sector SS. The length of the PAD of the short servo sector STS is equal to, for example, the length of the PAD of the normal servo sector SS. The length of the PAD of the short servo sector STS may be different from the length of the PAD of the normal servo sector SS. The length of the burst data of the short servo sector STS is equal to, for example, the length of the burst data of the normal servo sector SS. The length of the burst data of the short servo sector STS may be different from the length of the burst data of the normal servo sector SS. The length of the N burst of the short servo sector STS is equal to, for example, the length of the N burst of the normal servo sector SS. The length of the N burst of the short servo sector STS may be different from the length of the N burst of the normal servo sector SS. The length of the Q burst of the short servo sector STS is equal to, for example, the length of the Q burst of the normal servo sector SS. The length of the Q burst of the short servo sector STS may be different from the length of the Q burst of the normal servo sector SS. The additional pattern is data different from the post code. The frequency of the additional pattern is different from the frequency of the preamble. In other words, the frequency of the additional pattern is different from the frequency of the post code. For example, the frequency of the additional pattern is equal to the frequency of the burst data, for example, the frequency of the N burst and the frequency of the Q burst. The phase of the additional pattern periodically changes in the circumferential direction. The additional pattern is written in the data pattern in which the phases are equal in one servo track cycle in the radial direction of the disk 10. In other words, the phase of the particular additional pattern is equal to the phase of the additional pattern radially adjacent to the particular additional pattern (hereinafter referred to as the adjacent additional pattern). A length APL of the additional pattern is shorter than a length PCL of the post code. For example, the length APL of the additional pattern is longer than or equal to a sum of twice the one cycle of the preamble and the one cycle of the additional pattern. For example, the length APL of the additional pattern is shorter than the length PCL of the post code. In addition, the length APL of the additional pattern is less than a sum SVL of the lengths up to the preamble, the servo mark, the gray code, and the PAD.

Figure 9:
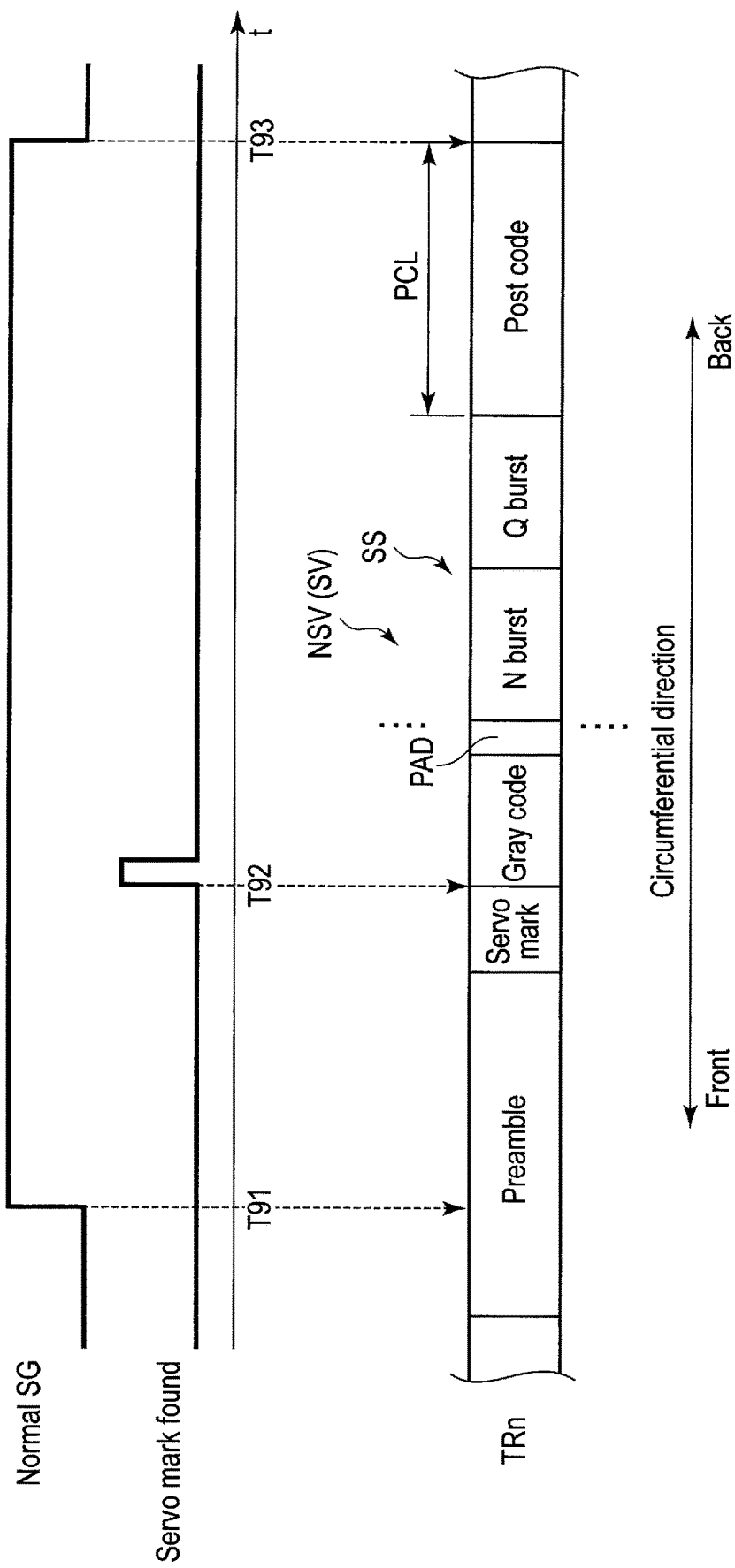
FIG. 9 is a diagram showing an example of read processing of a particular normal servo sector of a particular track.

FIG. 9 is a diagram showing an example of read processing of a particular normal servo sector SS of a particular track TRn. FIG. 9 shows a servo gate (hereinafter often called normal servo gate: normal SG) that executes servo gate of the normal servo sector SS written in a normal servo region NSV, and Servo Mark Found that indicates the timing of executing the servo read of the servo mark. These gates are asserted at rise and negated at fall. In FIG. 9, a horizontal axis of these gates represents time t. On the horizontal axis of FIG. 9, timings T91, T92, and T93 are shown. Timing T92 corresponds to the time after timing T91, and timing T93 corresponds to the time after timing T92. Timing T91 corresponds to the timing at which the normal SG asserts, timing T92 corresponds to the timing at which Servo Mark Found asserts, and timing T93 corresponds to the timing at which the normal SG negates.

In the example shown in FIG. 9, the system controller 130 asserts the normal SG at timing T91 to start the servo read of the servo sector SS at the initial part of the preamble. The system controller 130 reads a preamble, a servo mark, a gray code, a PAD, an N burst, a Q burst, and a post code of the normal servo sector SS in this order. The system controller 130 negates the normal SG and ends the servo read of the normal servo sector SS at the final part of the post code, at timing T93. The system controller 130 asserts the Servo Mark Found at timing T92 of reading the servo mark. For example, the system controller 130 reads the N burst or the Q burst based on timing T92 of reading the servo mark.

FIG. 10 is a diagram showing an example of read processing of a particular short servo sector STS of a particular track TRn. FIG. 10 shows a servo gate (hereinafter often called a short servo gate: short SG) for executing the servo read of the short servo sector STS written in a short servo region SSV. The short SG is asserted at rise and negated at fall. In FIG. 10, a horizontal axis of Short SG represents time t. On the horizontal axis of FIG. 10, timings T101 and T102 are shown. Timing T101 corresponds to timing at which the short SG asserts, and timing T102 corresponds to timing at which the short SG negates. For example, the short servo sector STS shown in FIG. 10 is written in a servo region SV located after the normal servo sector SS shown in FIG. 9, in the circumferential direction.

In the example shown in FIG. 10, the system controller 130 asserts the short SG at timing T101, based on timing T92 of Servo Mark Found shown in FIG. 9. For example, the system controller 130 asserts the short SG and starts the servo read of the short servo sector STS at timing T101 a certain time after timing T92 shown in FIG. 9. For example, the system controller 130 positions a read head 15R on a particular track TRn, based on the preamble, the servo mark, the gray code, and the like of the normal servo sector SS arranged at previous positions in the circumferential direction and shown in FIG. 9. The system controller 130 reads an N burst, a Q burst, and an additional pattern of the short servo sector STS in this order. The system controller 130 negates the short SG and ends the servo read of the short servo sector STS at the final part of the additional pattern, at timing T1102. For example, the system controller 130 negates the short SG at timing T102, based on the time for reading the N burst, the Q burst, and the post code of the normal servo sector SS shown in FIG. 9, timing T101, the length of the post code of the normal servo sector SS, the length of the additional pattern. For example, the system controller 130 negates the short SG at timing T102 after the time corresponding to a difference between the time for reading the N burst, the Q burst, and the post code of the normal servo sector SS shown in FIG. 9 and the time corresponding to a difference between the length of the post code and the length of the additional pattern, from timing T101.

The system controller 130 can select executing the servo read of a particular servo region SV in the normal SG or the short SG. In the following descriptions, the processing of executing the servo read of the normal servo sector SS and the short servo sector STS in the servo region SV in the normal SG is often called a normal servo mode, and the processing of reading the normal servo sector SS in the servo region SV in the normal SG and reading the short servo sector STS in the servo region SV in the short SG is often called a short servo mode. For example, in the normal servo mode, the system controller 130 reads the preamble, the servo mark, the gray code, the PAD, the N burst, the Q burst, and the post code of the normal servo sector SS, and reads the preamble, the servo mark, the gray code, the PAD, the N burst, the Q burst, and the additional pattern of the short servo sector STS. For example, in the short servo mode, the system controller 130 reads the preamble, the servo mark, the gray code, the PAD, the N burst, the Q burst, and the post code of the normal servo sector SS, and reads the N burst, the Q burst, and the additional pattern of the short servo sector STS. For example, the system controller 130 may read the servo region SV by using the normal servo mode during the seek operation, and may read the servo region SV by changing the mode to the short servo mode before executing the data write/read operation after the seek.

Figure 11:
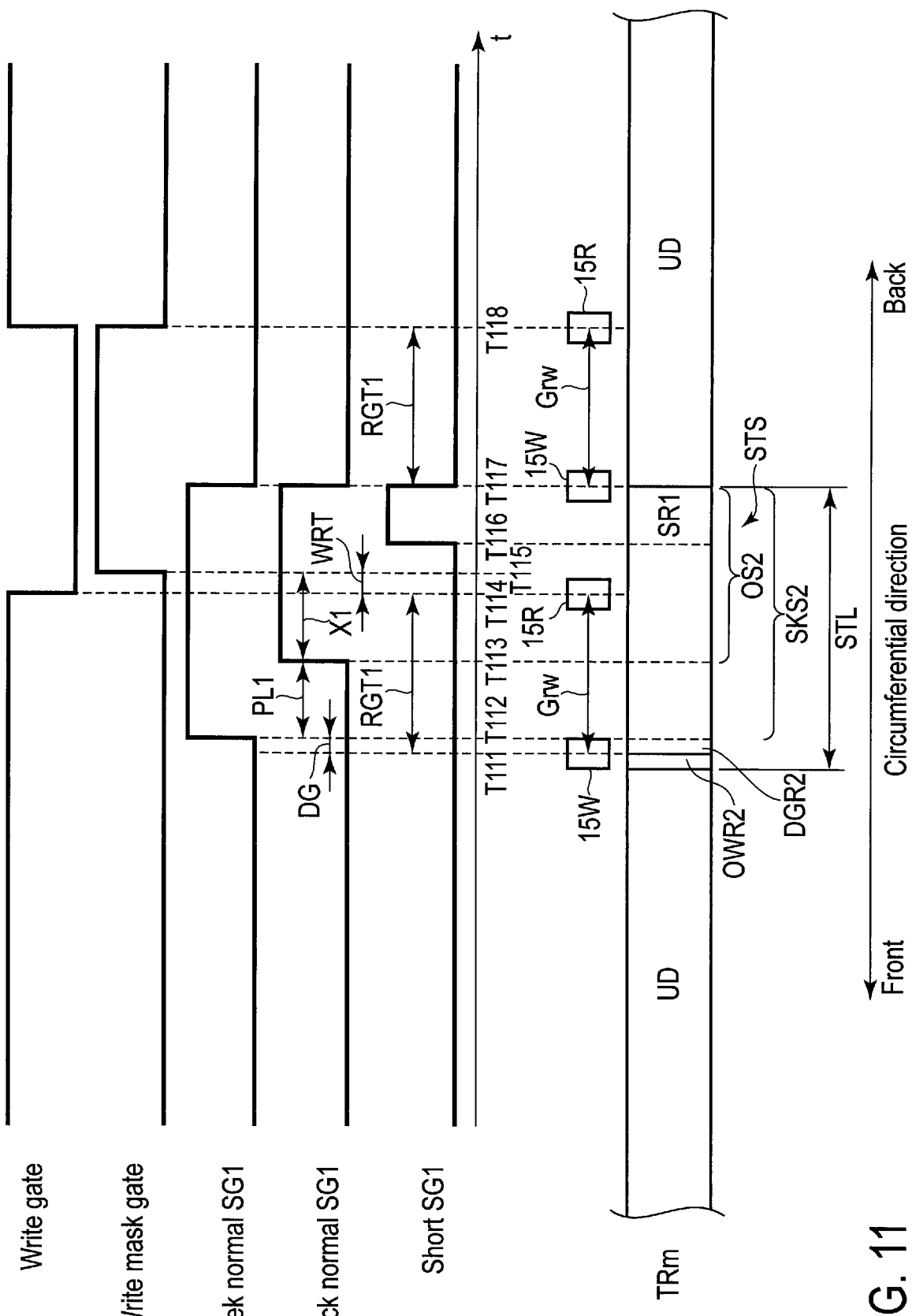
FIG. 11 is a schematic diagram showing an example of various gates and arrangement of a head, according to the second embodiment.

FIG. 11 is a schematic diagram showing an example of various gates and arrangement of a head 15, according to the second embodiment. FIG. 11 shows the write gate in a case of executing the servo read of the short servo sector STS in the short servo mode, the seek servo gate (Seek Normal SG1) in a case of executing the servo read of the short servo sector STS in the normal servo mode upon seeking from the other track to a particular track, the ontrack servo gate (Ontrack Normal SG1) in a case of executing the servo read of the normal servo sector STS in the short servo mode upon executing the ontrack, and the short servo gate (Short SG1) in a case of executing the servo read of the short servo sector STS in the short servo mode upon writing/reading the data on the track. These gates are asserted at rise and negated at fall. In FIG. 11, a horizontal axis of these gates represents time t. The horizontal axis of FIG. 11 shows timings T111, T112, T113, T114, T115, T116, T117, and T118. Timing T112 corresponds to the time after timing T111, timing T113 corresponds to the time after timing T112, timing T114 corresponds to the time after timing T113, timing T115 corresponds to the time after timing T114, timing T116 corresponds to the time after timing T115, timing T117 corresponds to the time after timing T116, and timing T118 corresponds to the time after timing T117. Timing T114 corresponds to the timing at which the write gate negates, timing T111 corresponds to the timing of starting degauss when the write gate negates at timing T114, and timing T112 corresponds to the timing of ending the degauss when the write gate negates and the timing of asserting the seek normal SG1. Timing T113 corresponds to the timing at which the ontrack Normal SG1 asserts, and timing T115 corresponds to the timing at which the write mask gate asserts. The timing of assertion of the seek normal SG1 may be in a range after timing T112 and before timing T113. The timing T116 corresponds to the timing at which the short SG1 asserts, timing T117 corresponds to the timing at which the short SG1 negates, the timing at which the seek normal SG1 negates, and the timing at which the ontrack normal SG1 negates, and timing T118 corresponds to the timing at which the write gate asserts and the timing at which the write mask gate negates.

A differential value of timings T111 and T112 corresponds to the degauss time DG, a differential value of timings T112 and T113 corresponds to an assert differential time PL1 between the timing of assertion of the seek normal SG1 and the timing of assertion of the ontrack normal SG1, a differential value between timings T113 and T115 corresponds to the differential time X1 between the timing of assertion of the ontrack normal SG and the timing of assertion of the write mask gate, a differential value of timings T114 and T115 corresponds to the transition time WRT, and each of a differential value of timings T111 and T114 and a differential value of timings T117 and T118 corresponds to the read/write gap time RGT1.

For example, a differential value (degauss time) of timings T111 and T112 corresponds to the differential value of timings T51 and T52 shown in FIG. 5. The differential value (degauss time) of timings T111 and T112 may be different from the differential value of timings T51 and T52 shown in FIG. 5. For example, a differential value (assert differential time) of timings T112 and T113 corresponds to the differential value of timings T52 and T53 shown in FIG. 5. The differential value (assert differential time) of timings T111 and T112 may be different from the differential value of timings T52 and T53 shown in FIG. 5. For example, a differential value (X1) of timings T113 and T115 corresponds to the differential value of timings T53 and T55 shown in FIG. 5. The differential value (X1) of timings T113 and T115 may be different from the differential value of timings T53 and T55 shown in FIG. 5. For example, a differential value (transition time) of timings T114 and T115 corresponds to the differential value of timings T54 and T55 shown in FIG. 5. The differential value (transition time) of timings T114 and T115 may be different from the differential value of timings T54 and T55 shown in FIG. 5.

In addition, FIG. 11 shows track TRm. On the track TRm, for example, the normal servo sectors SS and the short servo sectors STS are alternately arranged and spaced apart. On the track TRm, for example, user data UD is arranged between the normal servo sector SS and the short servo sectors STS. In the example shown in FIG. 11, the user data UD and the short servo sector STS are adjacent in the circumferential direction and do not include a gap or the like interposed therebetween. The short servo sector STS includes an overwrite region OWR2 and a degauss region DGR2. The overwrite region OWR2 is a region where the user data is overwritten. The degauss region DGR2 is the region where particular data is overwritten by degauss. For example, the overwrite region OWR2 and the degauss region DGR2 correspond to the region where the preamble is written before particular data is overwritten. In the short servo sector STS, the region excluding the overwrite region OWR2 and the degauss region DGR2 is called a seek normal servo sector SKS2. The seek normal servo sector SKS2 corresponds to servo data necessary for the servo read corresponding to the seek normal SG1. The seek normal servo sector SKS2 includes the ontrack normal servo sector OS2. The ontrack normal servo sector OS2 corresponds to servo data necessary for the servo read corresponding to the ontrack normal SG1. The ontrack normal servo sector OS2 includes a short servo sector SR1. The short servo sector SR1 corresponds to servo data necessary for the servo read corresponding to the short SG1. The length of the ontrack normal servo sector OS2 is shorter than the length of the seek normal servo sector SKS2. The length of the short servo sector SR1 is shorter than the length of the ontrack normal servo sector OS2. The region obtained by excluding the ontrack normal servo sector OS2 from the seek normal servo sector SKS2 corresponds to, for example, the region where the preamble is recorded. FIG. 11 shows a read head 15R for the track TRm at timing T114 at which the write gate is negated, a write head 15W corresponding to the read head 15R at timing T114, a read head 15R for the track TRm at timing T118 at which the write gate is asserted, and a write head 15W corresponding to the read head 15R at timing T118.

The system controller 130 negates the write gate so as not to overwrite particular data to the short servo sector STS, for example, the seek normal servo sector SKS2 at the servo read corresponding to the seek normal SG1, the ontrack normal SG1, and the short SG1. The system controller 130 asserts the write mask gate so as not to overwrite particular data to the seek normal servo sector SKS2 at the servo read corresponding to the seek normal SG1, the ontrack normal SG1, and the short SG1. For example, the system controller 130 asserts the write mask gate by referring to assertion of the ontrack normal SG1. In the example shown in FIG. 11, the system controller 130 asserts the write mask gate at timing T115 delayed by time X1 from timing T113 for assertion of the ontrack normal SG1. For example, the system controller 130 calculates differential time X1 (=X) in the above equation (1).

The system controller 130 asserts the write gate so as not to overwrite particular data to the servo sector SS, for example, the ontrack normal servo sector OS2 after ending the servo read corresponding to the seek normal SG1, the ontrack normal SG1, and the short SG1. In addition, the system controller 130 negates the write mask gate so as not to overwrite particular data to the ontrack normal servo sector OS2 after ending the servo read corresponding to the seek normal SG1, the ontrack normal SG1, and the short SG1. For example, the system controller 130 asserts the write gate at timing T118 delayed by the read/write gap time RGT from timing T117 at which the servo read corresponding to the seek normal SG1, the ontrack normal SG1, and the short SG1 is ended. In addition, for example, the system controller 130 negates the write mask gate at timing T118 delayed by the read/write gap time RGT from timing T117 at which the servo read corresponding to the seek normal SG1, the ontrack normal SG1, and the short SG1 is ended.

In the example shown in FIG. 11, the system controller 130 asserts the seek normal SG1 and starts the servo read processing of the seek normal servo sector SKS2 at timing T112, when executing the servo read of the short servo sector STS in the normal servo mode upon seeking the head 15 from the other track to the track TRm. The system controller 130 asserts the write mask gate at timing T115. After asserting the write mask gate at timing T115, the system controller 130 negates the seek normal SG1 and ends the servo read processing of the seek normal servo sector SKS2 (servo sector SS) at timing T117. After ending the servo read of the seek normal servo sector SKS2 at timing T117, the system controller 130 negates the write mask gate, asserts the write gate, and starts the write processing of user data UD immediately after the servo sector SS, at timing T118.

In the example shown in FIG. 11, the system controller 130 asserts the ontrack normal SG and starts the servo read processing of the ontrack normal servo sector OS2 at timing T113, when executing the servo read of the short servo sector STS in the normal SG, on the particular track TRm. The system controller 130 asserts the write mask gate at timing T115 that corresponds to the time delayed by time X1 from timing T113 for assertion of the ontrack normal SG1. After asserting the write mask gate at timing T115, the system controller 130 negates the ontrack normal SG1 and ends the servo read processing of the ontrack normal servo sector OS2 (short servo sector STS) at timing T117. After ending the servo read processing of the ontrack normal servo sector OS2 at timing T117, the system controller 130 negates the write mask gate, asserts the write gate, and starts the write processing of user data UD immediately after the short servo sector STS, at timing T118.

In the example shown in FIG. 11, the system controller 130 negates the write gate and stops the write processing at timing T114, when executing the servo read of the short servo sector STS in the short servo mode upon writing/reading the user data, on the particular track TRm. After stopping the write processing at timing T114, the system controller 130 asserts the write mask gate at timing T115 that corresponds to the time delayed by time X1 from timing T113 for assertion of the ontrack normal SG1. After asserting the write mask gate at timing T115, the system controller 130 asserts the short SG1 and starts the servo read processing of the short servo sector SR1 (servo sector SS) at timing T116. The system controller 130 negates the short SG1 and ends the servo read processing of the short servo sector SR1 at timing T117. After ending the servo read of the short servo sector SR1 at timing T117, the system controller 130 negates the write mask gate, asserts the write gate, and starts the write processing of user data UD immediately after the short servo sector STS, at timing T118.

Figure 12:
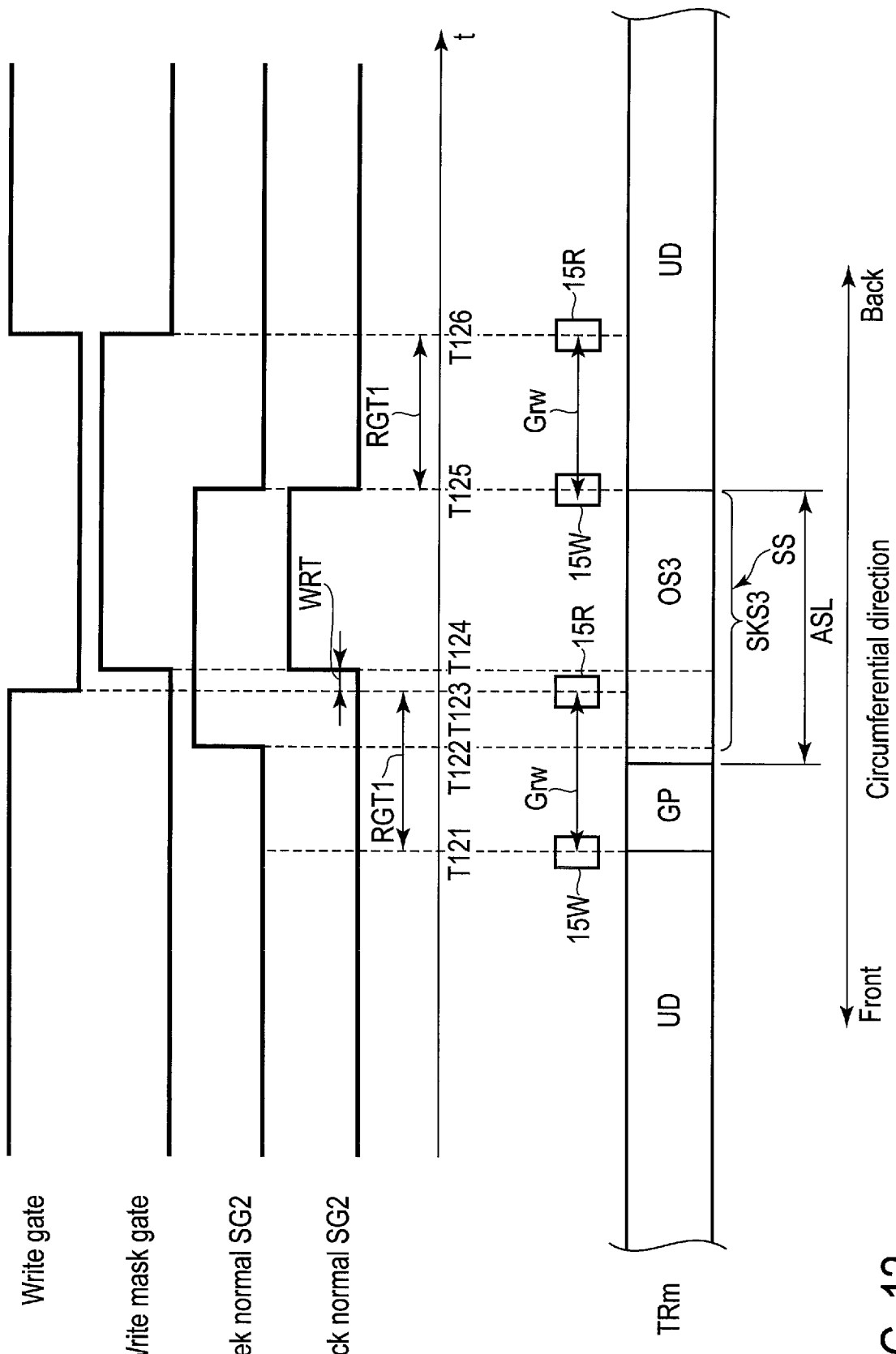
FIG. 12 is a schematic diagram showing an example of various gates and arrangement of the head, according to the second embodiment.

FIG. 12 is a schematic diagram showing an example of various gates and arrangement of the head 15, according to the second embodiment. FIG. 12 shows the write gate in a case of executing the servo read of the normal servo sector SS in the normal servo mode, the seek servo mode (Seek Normal SG2) in a case of executing the servo read of the normal servo sector SS in the normal servo mode upon seeking from the other track to a particular track, and the ontrack servo gate (Ontrack Normal SG2) in a case of executing the servo read of the normal servo sector SS in the normal servo mode upon writing/reading the data on the track. These gates are asserted at rise and negated at fall. In FIG. 12, a horizontal axis of these gates represents time t. On the horizontal axis of FIG. 12, timings T121, T122, T123, T124, T125, and T126 are shown. Timing T122 corresponds to the time after timing T121, timing T123 corresponds to the time after timing T122, timing T124 corresponds to the time after timing T123, timing T125 corresponds to the time after timing T124, and timing T126 corresponds to the time after timing T125. Timing T123 corresponds to the timing at which the write gate negates, timing T121 corresponds to the timing before the read/write gap time RGT1 from timing T123 at which the write gate negates, timing T122 corresponds to the timing at which the seek normal SG2 asserts, timing T124 corresponds to the timing at which the ontrack normal SG2 asserts and the timing at which the write mask gate asserts, timing T125 corresponds to the timing at which the seek normal SG2 negates and the timing at which the ontrack normal SG2 negates, and timing T126 corresponds to the timing at which the write gate asserts and the timing at which the write mask gate negates.

A differential value of timings T123 and T124 corresponds to a transition time WRT, and each of a differential value of timings T121 and T123 and a differential value of timings T125 and T126 corresponds to the read/write gap time RGT1. For example, the differential value of timings T123 and T124 corresponds to the differential value of timings T54 and T55 shown in FIG. 5. The differential value of timings T123 and T124 may be different from the differential value of timings T54 and T55 shown in FIG. 5.

FIG. 12 shows track TRm shown in FIG. 11. In the example shown in FIG. 12, a gap is arranged between the user data UD and the normal servo sector SS. The normal servo sector SS includes seek normal servo sector SKS3. The seek normal servo sector SKS3 corresponds to servo data necessary for the servo read corresponding to the seek normal SG2. The seek normal servo sector SKS3 includes the ontrack normal servo sector OS3. The ontrack normal servo sector OS3 corresponds to servo data necessary for the servo read corresponding to the ontrack normal SG2. The length of the ontrack normal servo sector OS3 is shorter than the length of the seek normal servo sector SKS3. The region obtained by excluding the ontrack normal servo sector OS3 from the seek normal servo sector SKS3 corresponds to the region where the preamble is recorded. FIG. 12 shows a read head 15R for the track TRm at timing T123 at which the write gate is negated, a write head 15W corresponding to the read head 15R at timing T123, a read head 15R for the track TRm at timing T126 at which the write gate is asserted, and a write head 15W corresponding to the read head 15R at timing T126.

The system controller 130 negates the write gate, and asserts the write mask gate together with the servo read corresponding to the ontrack normal SG2.

The system controller 130 asserts the write gate so as not to overwrite particular data to the servo sector SS, for example, the ontrack normal servo sector OS3 after ending the servo read corresponding to the seek normal SG2 and the ontrack normal SG2. In addition, the system controller 130 negates the write mask gate so as not to overwrite particular data to the ontrack normal servo sector OS3 after ending the servo read corresponding to the seek normal SG2 and the ontrack normal SG2. For example, the system controller 130 asserts the write gate at timing T126 delayed by the read/write gap time RGT from timing T125 at which the servo read corresponding to the seek normal SG2 and the ontrack normal SG2 is ended. In addition, for example, the system controller 130 negates the write mask gate at timing T126 delayed by the read/write gap time RGT from timing T125 at which the servo read corresponding to the seek normal SG2 and the ontrack normal SG2 is ended.

In the example shown in FIG. 12, the system controller 130 asserts the seek normal SG2 and starts the servo read processing of the seek normal servo sector SKS3 at timing T122, when executing the servo read of the normal servo sector SS in the normal servo mode upon seeking the head 15 from the other track to the track TRm. The system controller 130 asserts the write mask gate at timing T124. After asserting the write mask gate at timing T123, the system controller 130 negates the seek normal SG2 and ends the servo read processing of the seek normal servo sector SKS3 (servo sector SS) at timing T125. After ending the servo read processing of the seek normal servo sector SKS3 at timing T125, the system controller 130 negates the write mask gate, asserts the write gate, and starts the write processing of user data UD immediately after the servo sector SS, at timing T126.

In the example shown in FIG. 12, the system controller 130 negates the write gate and stops the write processing at timing T123, when executing the servo read of the normal servo sector SS in the normal SG upon locating on a particular track and writing/reading the user data. After stopping the write processing at timing T123, the system controller 130 asserts the write mask gate and the ontrack normal SG2 and starts the servo read processing of the ontrack normal servo sector OS3 at timing T124. After starting the servo read processing of the ontrack normal servo sector OS3 at timing T124, the system controller 130 negates the ontrack normal SG2 and ends the servo read of the ontrack normal servo sector OS3 (normal servo sector SS) at timing T125. After ending the servo read processing of the ontrack normal servo sector OS3 at timing T125, the system controller 130 negates the write mask gate, asserts the write gate, and starts the write processing of user data UD immediately after the short servo sector STS, at timing T126.

FIG. 13 is a flowchart showing an example of a servo read processing method according to the second embodiment.

The system controller 130 asserts the write gate and starts write processing on a particular track of the disk 10 (B601) and, negates the write gate and stops the write processing on a particular track (B1301). For example, the system controller 130 negates the write gate so as not to write particular data to the short servo sector STS, for example, the seek normal servo sector SKS2 at the servo read corresponding to the seek normal SG1, the ontrack normal SG1, and the short SG1. The system controller 130 asserts the write mask gate and confirms whether the write gate is not asserted simultaneously during the write mask gate assert (B1302). For example, the system controller 130 asserts the write mask gate so as not to overwrite particular data to the seek normal servo sector SKS2 at the servo read corresponding to the seek normal SG1, the ontrack normal SG1, and the short SG1. The system controller 130 asserts the servo gate, for example, the short SG1 and starts the servo read processing of the short servo sector STS when reaching the servo sector, for example, the short servo sector STS during the write processing on a particular track (B1303). The system controller 130 negates the servo gate, for example, the short SG and ends the servo read processing of the short servo sector STS (B1304). The system controller 130 negates the write mask gate, asserts the write gate to start the write processing after the servo sector SS of a particular track, for example, the short servo sector STS (B605), and ends the processing.

According to the second embodiment, the magnetic disk device 1 negates the write gate so as not to write particular data to the short servo sector STS, for example, the seek normal servo sector SKS2 at the servo read corresponding to the seek normal SG1, the ontrack normal SG1, and the short SG1. The magnetic disk device 1 asserts the write mask gate so as not to overwrite particular data to the seek normal servo sector SKS2 at the servo read corresponding to the seek normal SG1, the ontrack normal SG1, and the short SG1. For this reason, since the magnetic disk device 1 can improve the format efficiency of the disk 10 and detect abnormality that simultaneously asserts the write gate and the write mask gate, the magnetic disk device 1 can protect the servo data necessary for the servo control of the head 15. Therefore, the magnetic disk device 1 can improve the reliability.

Modified Example 1

The magnetic disk device 1 according to modified example 1 of the second embodiment is different from the above-described second embodiment with respect to a feature of using the short SG as the write mask gate.

In modified example 1, the R/W channel 50 outputs a fault signal to the HDC 60 and immediately stops the signal processing of the write data when the short SG and the write gate output from the HDC 60 (more specifically, gate generation unit 610) are asserted. In other words, when the short SG and the write gate output from the HDC 60 are asserted, the R/W channel 50 stops the write processing.

Figure 14:
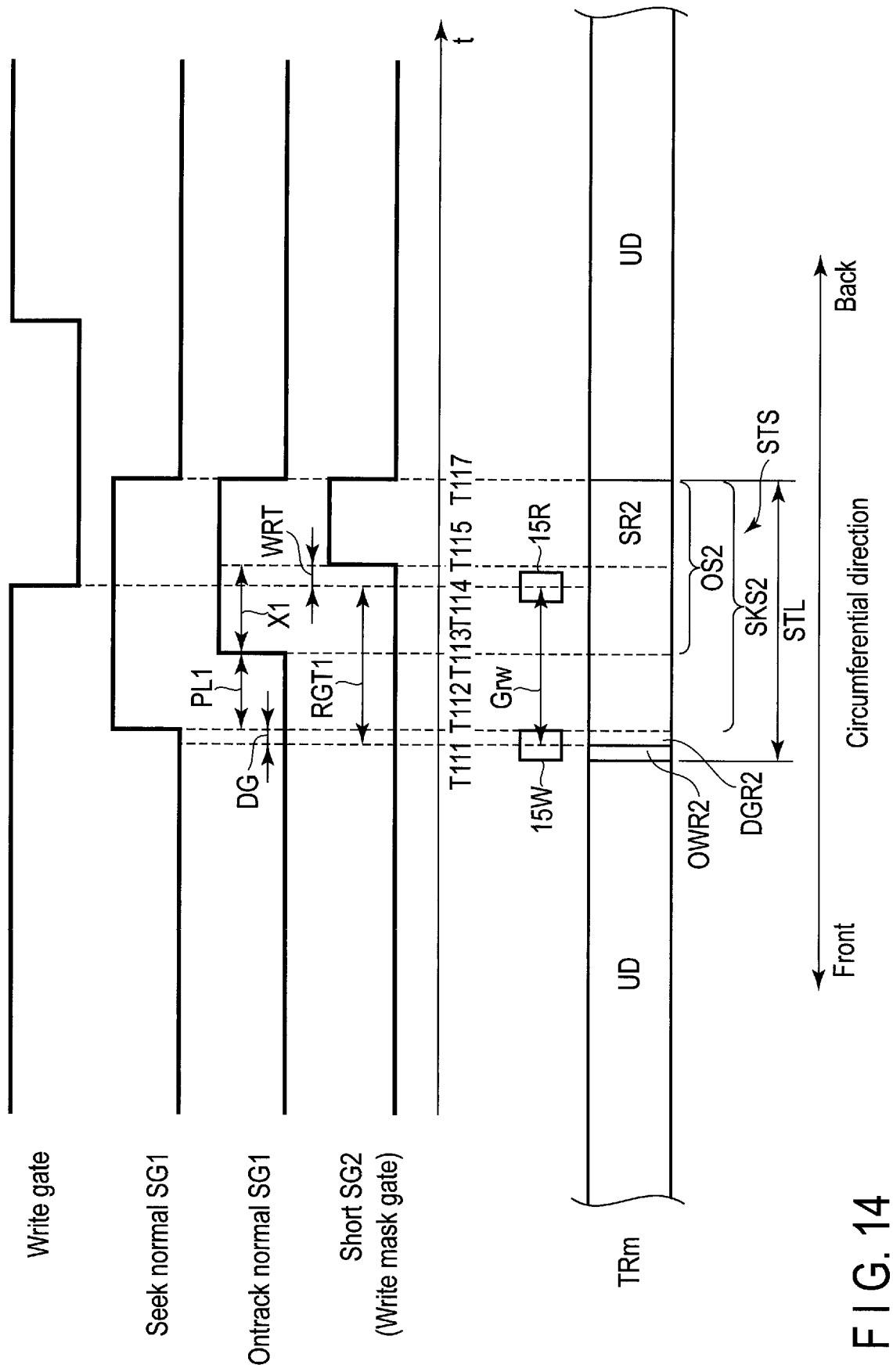
FIG. 14 is a schematic diagram showing an example of various gates and arrangement of a head, according to modified example 1.

FIG. 14 is a schematic diagram showing an example of various gates and arrangement of a head 15, according to modified example 1. FIG. 14 corresponds to FIG. 11. FIG. 14 shows short servo gate (Short SG2) in a case of executing the servo read of the short servo sector STS in the short servo mode upon writing/reading data on the track. In FIG. 14, the short SG2 functions as the mask gate. The short SG2 is asserted at rise and negated at fall. In FIG. 14, timing T115 corresponds to the timing at which the short SG2 asserts, on the horizontal axis of these gates. Timing T117 corresponds to the timing at which the short SG2 negates.

The system controller 130 negates the write gate so as not to write particular data to the short servo sector STS, for example, the seek normal servo sector SKS2 at the servo read corresponding to the seek normal SG1, the ontrack normal SG1, and the short SG2. The system controller 130 asserts the short SG2 so as not to overwrite particular data to the seek normal servo sector SKS2 at the servo read corresponding to the seek normal SG1, the ontrack normal SG1, and the short SG2. For example, the system controller 130 asserts the short SG2 by referring to assertion of the ontrack normal SG1. In the example shown in FIG. 14, the system controller 130 asserts the short SG2 at timing T115 delayed by time X1 from timing T113 for assertion of the ontrack normal SG1. For example, the system controller 130 calculates differential time X1 (=X) in the above equation (1).

In the example shown in FIG. 14, the system controller 130 negates the write gate and stops the write processing at timing T114, when executing the servo read of the short servo sector STS in the short servo mode upon writing/reading the user data, on the particular track. After stopping the write processing at timing T114, the system controller 130 asserts the short SG2 as the write mask gate at timing T115 that corresponds to the time delayed by time X1 from timing T113 for assertion of the ontrack normal SG1, and starts the servo read of the short servo sector SR2 (servo sector SS). The system controller 130 negates the short SG2 and ends the servo read of the short servo sector SR2 at timing T117.

Figure 15:
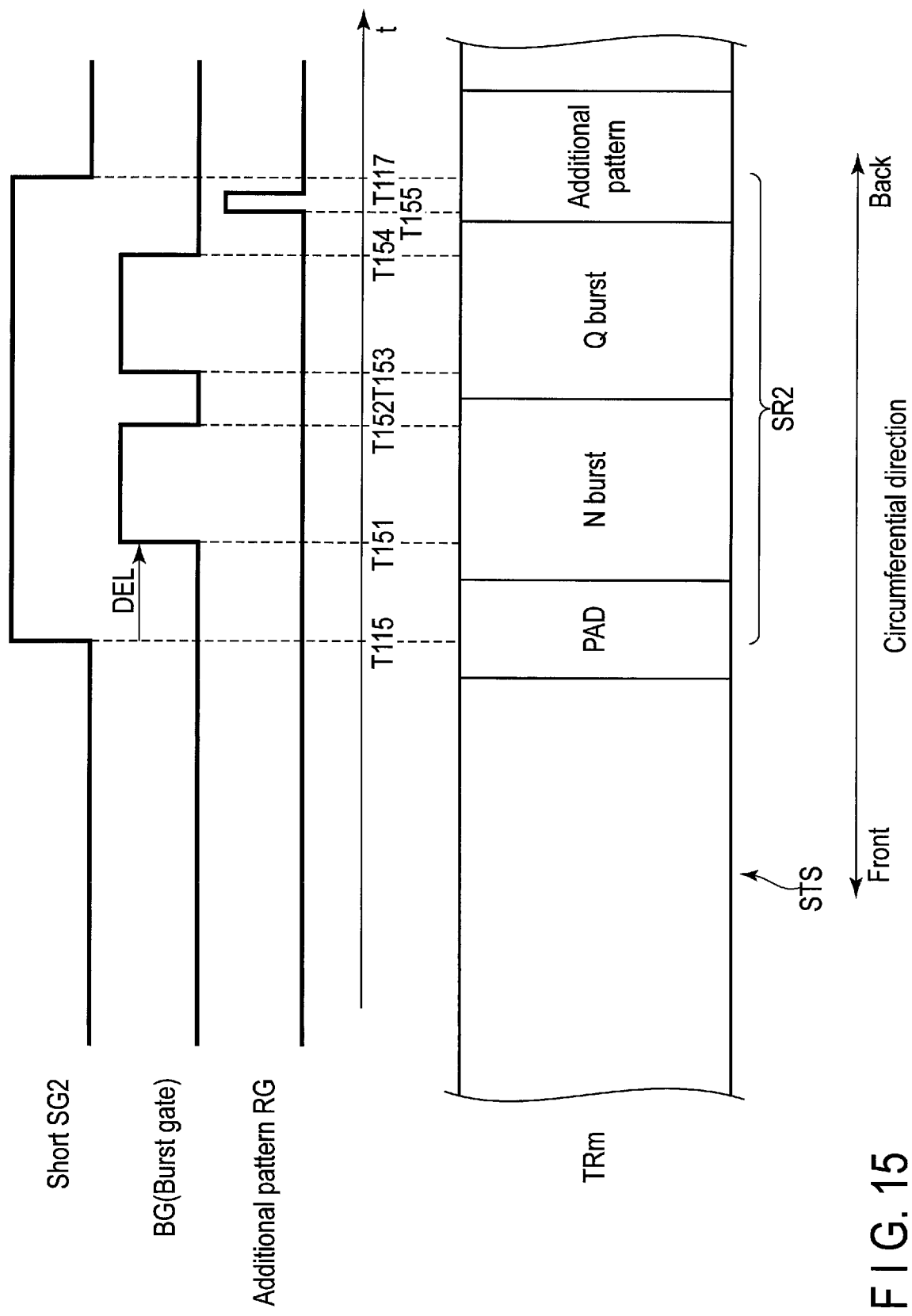
FIG. 15 is a diagram showing an example of Burst Gate in a case of servo reading of a short servo sector in Short Servo Mode.

FIG. 15 is a diagram showing an example of Burst Gate in a case of servo reading of a short servo sector STS in Short Servo Mode. FIG. 15 corresponds to FIG. 14. FIG. 15 shows a burst gate (BG) that reads burst data in a case of executing the servo read of the short servo sector STS in the short servo mode, and an additional pattern RG indicating the timing of executing the servo read of an additional pattern. These gates are asserted at rise and negated at fall. In FIG. 15, a horizontal axis of these gates represents time t. The horizontal axis of FIG. 15 represents timings T151, T152, T153, T154, and T155. Timing T151 corresponds to the time after timing T115, timing T152 corresponds to the time after timing T151, timing T153 corresponds to the time after timing T152, timing T154 corresponds to the time after timing T153, timing T155 corresponds to the time after timing T154, and timing T117 corresponds to the time after timing T155.

When asserting the short SG2 and starting the servo read processing of the short servo sector SR2 (servo sector SS) at timing T115, the system controller 130 asserts BG at timing T151 corresponding to the time delayed by time DEL from timing T115 and starts the servo read of the N burst and the Q burst. The system controller 130 asserts the BG and starts the servo read processing of the N burst at timing T151, negates the BG and ends the servo read processing of the N burst at timing T152, asserts the BG and starts the servo read processing of the Q burst at timing T153, and negates the BG and ends the servo read processing of the Q burst at timing T154. The system controller 130 asserts an additional pattern RG at timing T155 for reading the additional pattern.

FIG. 16 is a flowchart showing an example of a servo read processing method according to modified example 1.

The system controller 130 asserts the write gate and starts write processing on a particular track of the disk 10 (B601) and, negates the write gate and stops the write processing on a particular track (B1601). The system controller 130 asserts the short SG2 as the write mask and starts the servo read of the short servo sector STS when reaching the short servo sector STS during the write processing on a particular track (B1602). For example, the system controller 130 asserts the short SG2 as the write mask gate at the timing delayed by time X1 from the timing at which the ontrack normal SG1 asserts. The system controller 130 negates the short SG2 and asserts the write gate (B1603) and ends the processing.

According to modified example 1, the magnetic disk device 1 stops the write processing when the short SG and the write gate assert. The magnetic disk device 1 asserts the short SG2 so as not to overwrite particular data to the seek normal servo sector SKS2 at the servo read corresponding to the seek normal SG1, the ontrack normal SG1, and the short SG2. For this reason, since the magnetic disk device 1 can improve the format efficiency of the disk 10 and detect abnormality that short servo gate functioning the write gate and the write mask gate asserts simultaneously, the magnetic disk device 1 can protect the servo data necessary for the servo control of the head 15. Therefore, the magnetic disk device 1 can improve the reliability.

Third Embodiment

The magnetic disk device 1 according to the third embodiment is different from the first embodiment, the second embodiment and modified example 1 described above with respect to a feature that a plurality of servo sectors different in servo frequency are positioned on a particular track of the disk 10.

FIG. 17 is a schematic diagram showing an example of arrangement of a servo region, according to the third embodiment. In FIG. 17, a user data region 10a is divided into an inner circumferential region IR located in the inner direction, an outer circumferential region OR located in the outer direction, and an intermediate region MR located between the inner circumferential region IR and the outer circumferential region OR.

A servo region SV includes a plurality of zone servo regions ZSV. The zone servo regions ZSV are discretely arranged in the radial direction. Each of the zone servo regions ZSV extends in the radial direction. In the following descriptions, one zone servo region ZSV on a particular track is often called "zone servo sector". The zone servo region ZSV may also be called a zone servo sector ZSV. The zone servo sector includes servo data. The "servo data written in the zone servo sector" is often called "zone servo sector".

A servo frequency of the zone servo region in the outer direction of a plurality of zone servo regions ZSV of a particular servo region SV is larger than a servo frequency of the zone servo region in the inner direction of the zone servo regions ZSV of this servo region SV. In addition, a servo frequency of the zone servo sector in the outer direction of a particular zone servo region ZSV is larger than a servo frequency of the zone servo sector in the inner direction of this zone servo region ZSV. A linear velocity of the head 15 relative to the disk 10, at the radial position in the inner direction, is higher than that at the radial direction in the outer direction. For this reason, the format efficiency can be improved by making the servo frequency of the servo region in the outer direction larger than the servo frequency of the servo region in the inner direction.

In the example shown in FIG. 17, the servo region SV includes zone servo regions ZSV0, ZSV1, and ZSV2. The zone servo regions ZSV0, ZSV1, and ZSV2 are arranged in a zigzag form in the radial direction. The zone servo region ZSV0 is located in the inner direction than the zone servo region ZSV1. The zone servo region ZSV2 is located in the outer direction than the zone servo region ZSV1. For example, the zone servo region ZSV0 is arranged from an inner circumferential region IR to an intermediate circumferential region MR, the zone servo region ZSV1 is arranged from the inner circumferential region IR to an outer circumferential region OR, and the zone servo region ZSV2 is arranged from an intermediate circumferential region MR to the outer circumferential region OR. In the following descriptions, the particular radial region where the zone servo regions ZSV are arranged is often called a zone servo boundary ZB. The zone servo regions ZSV0 and ZSV1 are arranged on the track TRg. In other words, the zone servo regions ZSV0 and ZSV1 can be arranged on a zone servo boundary ZB1. The zone servo regions ZSV1 and ZSV2 are arranged on the track TRh. In other words, the zone servo regions ZSV1 and ZSV2 can be arranged on a zone servo boundary ZB2. For example, a servo frequency of the zone servo region ZSV1 is larger than a servo frequency of the zone servo region ZSV0, and a servo frequency of the zone servo region ZSV2 is larger than a servo frequency of the zone servo region ZSV1.

FIG. 18 is a schematic diagram showing an example of data array in a circumferential direction of a zone servo boundary ZB2 shown in FIG. 17. FIG. 18 shows data array of the track TRh shown in FIG. 17.

In the example shown in FIG. 18, the track TRh includes user data UD, a zone servo sector ZSS1, a gap GP, and a zone servo sector ZSS2. In the example shown in FIG. 18, the user data UD, the zone servo sector ZSS1, the gap GP, the zone servo sector ZSS2, and the user data UD are arranged in order of description from the back side to the front side of the circumferential direction, on the track TRh. The user data UD is adjacent to the front end of the zone servo sector ZSS2. The gap GP is adjacent to the back end of the zone servo sector ZSS2. The zone servo sector ZSS1 is adjacent to the back end of the gap GP. The user data UD is adjacent to the back end of the zone servo sector ZSS1. The zone servo sector ZSS2 is arranged before the zone servo sector ZSS1 across the gap GP. In other words, the zone servo sector ZSS1 is arranged after the zone servo sector ZSS2 across the gap GP. In the example shown in FIG. 18, the zone servo sector ZSS2 is shorter than the zone servo sector ZSS1. In other words, the zone servo sector ZSS1 is longer than the zone servo sector ZSS2. The gap GP is desirably short in order to improve the format efficiency.

The system controller 130 positions the head 15 by executing the servo read of the one of the zone servo sectors different in servo frequency, on the zone servo boundary ZB. For this reason, the system controller 130 asserts and negates the write mask gate so as not to overwrite particular data to one zone servo sector which executes servo read for positioning the head 15, of the zone servo sectors, and a zone servo sector other than the zone servo sector which executes servo read for positioning the head 15, of the zone servo sectors, on the zone servo boundary ZB.

Figure 19:
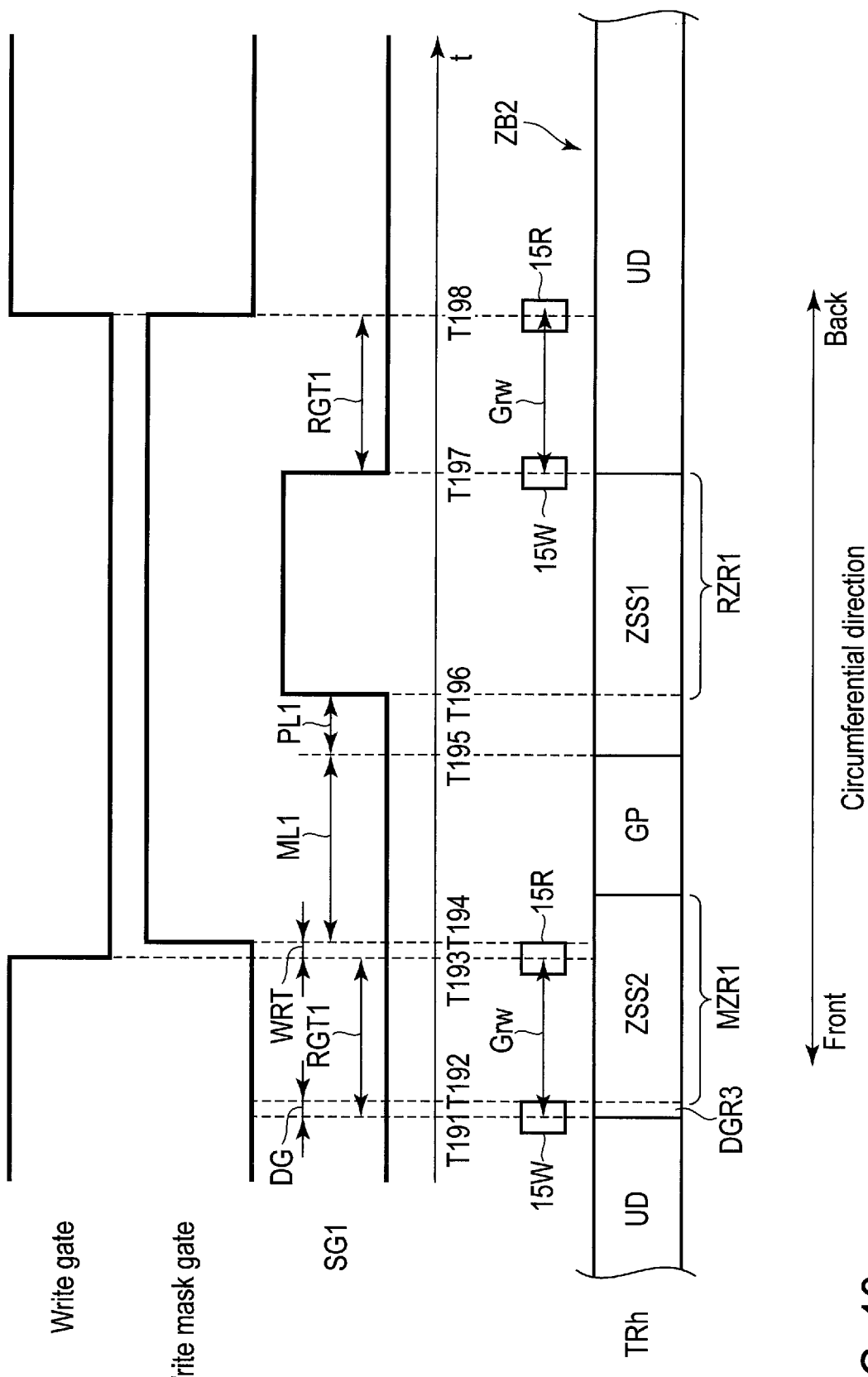
FIG. 19 is a schematic diagram showing an example of various gates and arrangement of a head, according to the third embodiment.

FIG. 19 is a schematic diagram showing an example of various gates and arrangement of the head 15, according to the third embodiment. FIG. 19 shows the write gate in a case of executing the servo read of the zone servo sector ZSS1 on the track TRh, the write mask gate in a case of executing the servo read of the zone servo sector ZSS1 on the track TRh, and the ontrack servo gate (SG1) in a case of executing the servo read of the zone servo sector ZSS1 upon writing/ reading the data on the track TRh. These gates are asserted at rise and negated at fall. In FIG. 19, a horizontal axis of these gates represents time t. The horizontal axis of FIG. 19 shows timings T191, T192, T193, T194, T195, T196, T197, and T198. Timing T192 corresponds to the time after timing T191, timing T193 corresponds to the time after timing T192, timing T194 corresponds to the time after timing T193, timing T195 corresponds to the time after timing T194, timing T196 corresponds to the time after timing T195, timing T197 corresponds to the time after timing T196, and timing T198 corresponds to the time after timing T197. Timing T193 corresponds to the timing at which the write gate negates, timing T191 corresponds to the timing before the read/write gap time RGT1 from timing T193 at which the write gate negates, timing T192 corresponds to the timing after the degauss time from timing T192, timing T194 corresponds to the timing at which the write mask gate asserts, and timing T196 corresponds to the timing at which the SG1 asserts. Timing T195 is the timing before assert differential time PL1 from timing T196 and corresponds to the timing at which the seek servo gate (not shown) asserts in a case of executing the servo read of the servo sector ZSS1 upon seeking from the other track to the track TRh. Timing T197 corresponds to the timing at which the SG1 negates. Timing T198 corresponds to the timing at which the write gate asserts and the timing at which the write mask gate negates.

A differential value of timings T191 and T192 corresponds to the degauss time DG, a differential value of timings T191 and T193 corresponds to the read/write gap time RGT1, a differential value of timings T193 and T194 corresponds to the transition time WRT, a differential value of timings T194 and T195 corresponds to a time (hereinafter often called a post-sector mask time) ML1 corresponding to a region where particular data in the zone servo sector ZSS2 is not overwritten, a differential value of timings T195 and T196 corresponds to the assert differential time PL1 of the time to assert the seek servo gate (not shown) and the time for assertion of the SG1 in a case of executing the servo read of the zone servo sector ZSS1 upon seeking from the other track to the track TRh, and a differential value of timings T197 and T198 corresponds to the read/write gap time RGT1.

For example, a differential value (degauss time) of timings T191 and T192 corresponds to the differential value of timings T51 and T52 shown in FIG. 5. The differential value (degauss time) of timings T191 and T192 may be different from the differential value of timings T51 and T52 shown in FIG. 5. For example, a differential value (transition time) of timings T193 and T194 corresponds to the differential value of timings T54 and T55 shown in FIG. 5. The differential value (transition time) of timings 1193 and T194 may be different from the differential value of timings T54 and T55. For example, a differential value (assert differential time) of timings T195 and T196 corresponds to the differential value of timings T52 and T53 shown in FIG. 5. The differential value (assert differential time) of timings T195 and T196 may be different from the differential value of timings T52 and T53 shown in FIG. 5.

In addition, FIG. 19 shows track TRh shown in FIG. 18. In the example shown in FIG. 19, the zone servo sector ZSS2 includes a degauss region DGR3. The degauss region DGR3 is the region where particular data is overwritten by degauss. For example, the degauss region DGR3 corresponds to the region where the preamble is written before particular data is overwritten. A region excluding the degauss region DGR3, in the zone servo sector ZSS2, is called a mask zone servo sector MZR1. The mask zone servo sector MZR1 corresponds to a region where particular data is not overwritten. In the example shown in FIG. 19, the zone servo sector ZSS1 includes a read zone servo sector RZR1. The read zone servo sector RZR1 corresponds to servo data necessary for the servo read corresponding to SG1. FIG. 19 shows a read head 15R for the track TRh at timing T193 at which the write gate is negated, a write head 15W corresponding to the read head 15R at timing T193, a read head 15R for the track TRh at timing T198 at which the write gate is asserted, and a write head 15W corresponding to the read head 15R at timing T198.

The system controller 130 negates the write gate so as not to overwrite particular data to the zone servo sector ZSS2, for example, the mask zone servo sector MZR1 at the servo read corresponding to the SG1, on the track TRh located on the zone servo boundary ZB. The system controller 130 asserts the write mask gate so as not to overwrite particular data to the zone servo sector ZSS2, for example, the mask zone servo sector MZR1 at the servo read corresponding to the SG1, on the track TRh located on the zone servo boundary ZB.

The system controller 130 asserts the write gate so as not to overwrite particular data to the zone servo sector ZSS1, after ending the servo read corresponding to the SG1, on the track TRh located on the zone servo boundary ZB2. In addition, the system controller 130 negates the write mask gate so as not to overwrite particular data to the zone servo sector ZSS1, after ending the servo read corresponding to the SG1, on the track TRh located on the zone servo boundary ZB.

In the example shown in FIG. 19, the system controller 130 negates the write gate and stops the write processing at timing T193, when executing the servo read of the zone servo sector ZSS1 upon writing/reading the user data on the track TRh located on the zone servo boundary ZB2. After stopping the write processing at timing T193, the system controller 130 asserts the write mask gate at timing T194 that corresponds to the time delayed by transition time WRT from timing T193 at which the write processing is stopped. In other words, after stopping the write processing at timing T193, the system controller 130 asserts the write mask gate at timing T194 advancing by the time obtained by adding an assert differential time PL1 to a previous sector mask time ML1 from timing T196 to assert SG1. After asserting the write mask gate at timing T194, the system controller 130 asserts the SG1 and starts the servo read processing of a read zone servo sector RZR1 (zone servo sector ZSS1) at timing T196 delayed by the time including a previous sector mask time ML1 and an assert differential time PL1 from timing T194 at which the write mask gate has been asserted. The system controller 130 negates the SG1 and ends the servo read processing of the read zone servo sector RZR1 at timing T197. After ending the servo read processing of the read zone servo sector RZR1 at timing T197, the system controller 130 negates the write mask gate, asserts the write gate, and starts the write processing of user data UD immediately after the zone servo sector ZSS2, at timing T198.

Figure 20:
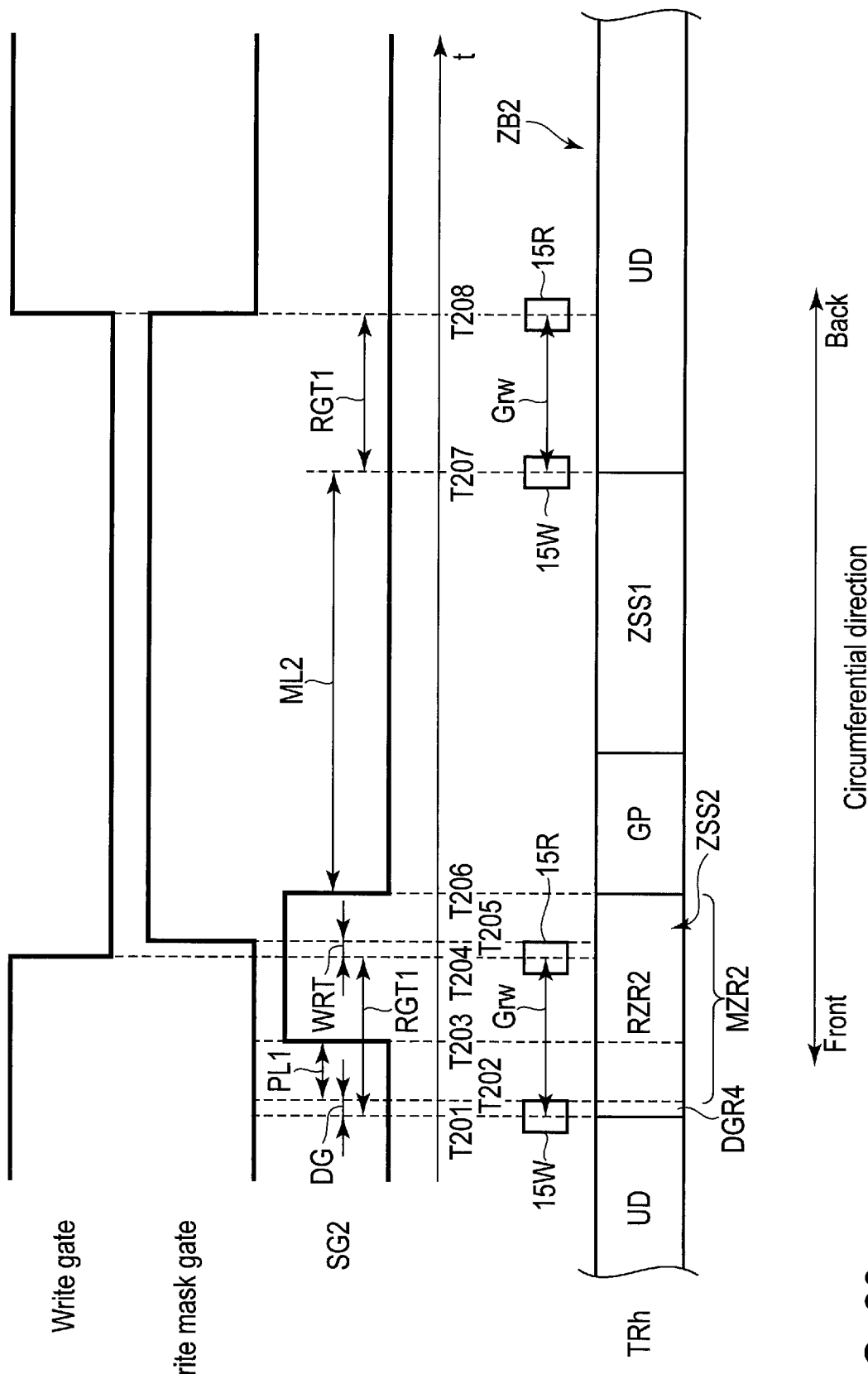
FIG. 20 is a schematic diagram showing an example of various gates and arrangement of a head, according to the third embodiment.

FIG. 20 is a schematic diagram showing an example of various gates and arrangement of the head 15, according to the third embodiment. FIG. 20 shows the write gate in a case of executing the servo read of the zone servo sector ZSS2 on the track TRh, the write mask gate in a case of executing the servo read of the zone servo sector ZSS2 on the track TRh, and the ontrack servo gate (hereinafter often called SG2) in a case of executing the servo read of the zone servo sector ZSS2 upon writing/reading the data on the track TRh. These gates are asserted at rise and negated at fall. In FIG. 20, a horizontal axis of these gates represents time t. The horizontal axis of FIG. 20 shows timings T201, T202, T203, T204, T205, T206, T207, and T208. Timing T202 corresponds to the time after timing T201, timing T203 corresponds to the time after timing T202, timing T204 corresponds to the time after timing T203, timing T205 corresponds to the time after timing T204, timing T206 corresponds to the time after timing T205, timing T207 corresponds to the time after timing T206, and timing T208 corresponds to the time after timing T207. Timing T204 corresponds to the timing at which the write gate negates, timing T201 corresponds to the timing before the read/write gap time RGT1 from timing T204 at which the write gate negates, timing T202 corresponds to the timing after the degauss time from timing T201, timing T203 corresponds to the timing at which the SG2 asserts, and timing T205 corresponds to the timing at which the write mask gate asserts. Timing T206 corresponds to the timing at which the SG2 negates, timing T208 corresponds to the timing at which the write gate asserts and the timing at which the write mask gate negates, and timing T207 corresponds to the timing before the read/write gap time from timing 208.

A differential value of timings T201 and T202 corresponds to the degauss time DG, a differential value of timings T202 and T203 corresponds to the assert differential time PL1 between the time for asserting the seek servo gate (not shown) and the time for asserting the SG2 in a case of executing the servo read of the zone servo sector ZSS2 upon seeking from the other track to the track TRh, a differential value of timings T204 and T205 corresponds to the transition time WRT, a differential value of timings T201 and T204 and a differential time of timings T207 and T208 correspond to the read/write gap time RGT1, and a differential time of timings T206 and T207 corresponds to time ML2 obtained by adding the time (hereinafter often called a post-sector mask time) corresponding to the gap GP to the time corresponding to the zone servo sector ZSS1.

For example, a differential value (degauss time) of timings T201 and T202 corresponds to the differential value of timings T51 and T52 shown in FIG. 5. The differential value (degauss time) of timings T201 and T202 may be different from the differential value of timings T51 and T52 shown in FIG. 5. For example, a differential value (transition time) of timings T204 and T205 corresponds to the differential value of timings T54 and T55 shown in FIG. 5. The differential value (transition time) of timings T204 and T205 may be different from the differential value of timings T54 and T55. For example, a differential value (assert differential time) of timings T202 and T203 corresponds to the differential value of timings T52 and T53 shown in FIG. 5. The differential value (assert differential time) of timings T202 and T203 may be different from the differential value of timings T52 and T53 shown in FIG. 5.

In addition, FIG. 20 shows track TRh shown in FIG. 18. In the example shown in FIG. 20, the zone servo sector ZSS2 includes a degauss region DGR4. The degauss region DGR4 is the region where particular data is overwritten by degauss. For example, the degauss region DGR4 corresponds to the region where the preamble is written before particular data is overwritten. A region excluding the degauss region DGR4, in the zone servo sector ZSS2, is called a mask zone servo sector MZR2. The mask zone servo sector MZR2 corresponds to a region where particular data is not overwritten. The mask zone servo sector MZR2 includes a read zone servo sector RZR2. The read zone servo sector RZR2 corresponds to servo data necessary for the servo read corresponding to SG2. FIG. 20 shows a read head 15R for the track TRh at timing T204 at which the write gate is negated, a write head 15W corresponding to the read head 15R at timing T204, a read head 15R for the track TRh at timing T208 at which the write gate is asserted, and a write head 15W corresponding to the read head 15R at timing T208.

The system controller 130 negates the write gate so as not to overwrite particular data to the zone servo sector ZSS2, for example, the mask zone servo sector MZR2 at the servo read corresponding to the SG2, on the track TRh located on the zone servo boundary ZB2. The system controller 130 asserts the write mask gate so as not to overwrite particular data to the zone servo sector ZSS2, for example, the mask zone servo sector MZR2 at the servo read corresponding to the SG2, on the track TRh located on the zone servo boundary ZB2.

The system controller 130 asserts the write gate so as not to overwrite particular data to the zone servo sector ZSS1, after ending the servo read corresponding to the SG2, on the track TRh located on the zone servo boundary ZB2. In addition, the system controller 130 negates the write mask gate so as not to overwrite particular data to the zone servo sector ZSS1, after ending the servo read corresponding to the SG2, on the track TRh located on the zone servo boundary ZB2.

In the example shown in FIG. 20, when executing the servo read of the zone servo sector ZSS2 upon locating on the track TRh located on the zone servo boundary ZB2 and writing/reading the user data, the system controller 130 asserts the SG2 and starts the servo read of the read zone servo sector RZR2 (zone servo sector ZSS2) at timing T203 delayed by the time obtained by adding the assert differential time PL1 to the degauss time DG from the leading end of the zone servo sector ZSS2. After starting the servo read of the read zone servo sector RZR2 at timing T203, the system controller 130 negates the write gate and stops the write processing at timing T204. After stopping the write processing at timing T204, the system controller 130 asserts the write mask gate at timing T205 that corresponds to the time delayed by transition time WRT from timing T204 at which the write processing is stopped. In other words, after stopping the write processing at timing T204, the system controller 130 asserts the write mask gate at timing T205 delayed by a particular time (=read/write gap time RGT1− degauss time DG−assert differential time PL1+transition time WRT) from timing T203 at which the SG2 is asserted. After asserting the write mask gate at timing T205, the system controller 130 negates the SG2 and ends the servo read processing of the read zone servo sector RZR2 (zone servo sector ZSS2) at timing T206 that corresponds to the back end of the zone servo sector ZSS2. After ending the servo read processing of the read zone servo sector RZR2 at timing T206, the system controller 130 negates the write mask gate, asserts the write gate, and starts the write processing of user data UD immediately after the zone servo sector ZSS1, at timing T208 delayed by a sum of the post-sector mask time ML2 and the read/write gap time RGT1 from timing T206 at which the SG2 has been negated.

According to the third embodiment, the magnetic disk device 1 positions the head 15 by executing the servo read of the one of the zone servo sectors different in servo frequency, on the zone servo boundary ZB. For this reason, the magnetic disk device 1 asserts and negates the write mask gate so as not to overwrite particular data to one zone servo sector which executes servo read for positioning the head 15, of the zone servo sector, and a zone servo sector other than the zone servo sector which executes servo read for positioning the head 15, of the zone servo sector, on the zone servo boundary ZB. For this reason, since the magnetic disk device 1 can improve the format efficiency of the disk 10 and detect abnormality that simultaneously asserts the write gate and the write mask gate, the magnetic disk device 1 can protect the servo data necessary for the servo control of the head 15. Therefore, the magnetic disk device 1 can improve the reliability.

Fourth Embodiment

A magnetic disk device 1 according to the fourth embodiment is different from the first embodiment, the second embodiment, modified example 1, and the third embodiment described above with respect to a feature of being a magnetic disk device of a two-dimensional magnetic recording (TDMR) system comprising a plurality of read heads.

FIG. 21 is a block diagram showing a configuration of the magnetic disk device 1 according to the fourth embodiment.

A read head 15R includes read heads 15R1 and 15R2. The read heads 15R1 and 15R2 read data written to the disk 10. The read head 15R1 is provided at, for example, a position farthest from the write head 15W. The read head 15R2 is provided at, for example, a position second farthest next to the read head 15R1 from the write head 15W. In other words, the read head 15R2 is provided between the write head 15W and the read head 15R1. Three or more read heads may be provided.

FIG. 22 is a schematic diagram showing an example of the structure of the read head 15R according to the fourth embodiment.

In the example shown in FIG. 22, the head 15 is provided with a write head 15W and a read head 15R2 remote from each other in a particular distance (read gap) Grwt in the circumferential direction. The read/write gap Grwt corresponds to a circumferential distance between the write head 15W and the read head closest to the write head 15W of the read heads, for example, the read head 15R2, in the TDMR magnetic disk device 1. In addition, the head 15 is provided with read heads 15R1 and 15R2 remote from each other in a particular distance (hereinafter often called a down track separation: DTS) DTS in the circumferential direction. DTS corresponds to a circumferential distance between a central part RC1 of one of the read heads, for example, the read head 15R1, and a central part RC2 of the different read head adjacent to the read head 15R1 of the read heads in the circumferential direction, for example, the read head 15R2. In the following descriptions, the central part RC1 of the read head 15R1 is often simply called the read head 15R1, and the central part RC2 of the read head 15R2 is often simply called the read head 15R2. In the example illustrated in FIG. 22, the read heads 15R1 and 15R2 are linearly arranged in the circumferential direction but may be dis-placed in the radial direction. In addition, in the example shown in FIG. 22, the head 15 is not inclined outwardly or inwardly (in a state where a skew angle is zero degrees), but may be inclined outwardly or inwardly. In this case, the DTS corresponds to a distance in the circumferential direction between the read heads 15R1 and 15R2, at the head 15 inclined outwardly or inwardly.

The system controller 130 selects a read head to be used to position the head 15, of the read heads. In addition, the system controller 130 switches (selects or changes) a read head executing the read processing of data of the disk 10, of the read heads. In the following descriptions, the read head executing the read processing of data of the disk 10, of the read heads is called a processing read head. For example, the system controller 130 generates the write gate, based on the circumferential distance between the write head and the read head located at a position farthest from the write head 15W of the read heads, and a circumferential distance between the write head and the processing read head. The system controller 130 generates the write mask gate in accordance with, for example, the read head selected as the processing read head. When switching a particular read head of the read heads, for example, the read head 15R1 to a read head different from this read head, for example, the read head 15R2, the system controller 130 adjusts the write mask gate, based on the DTS between the read head 15R1 and the read head 15R2.

Figure 23:
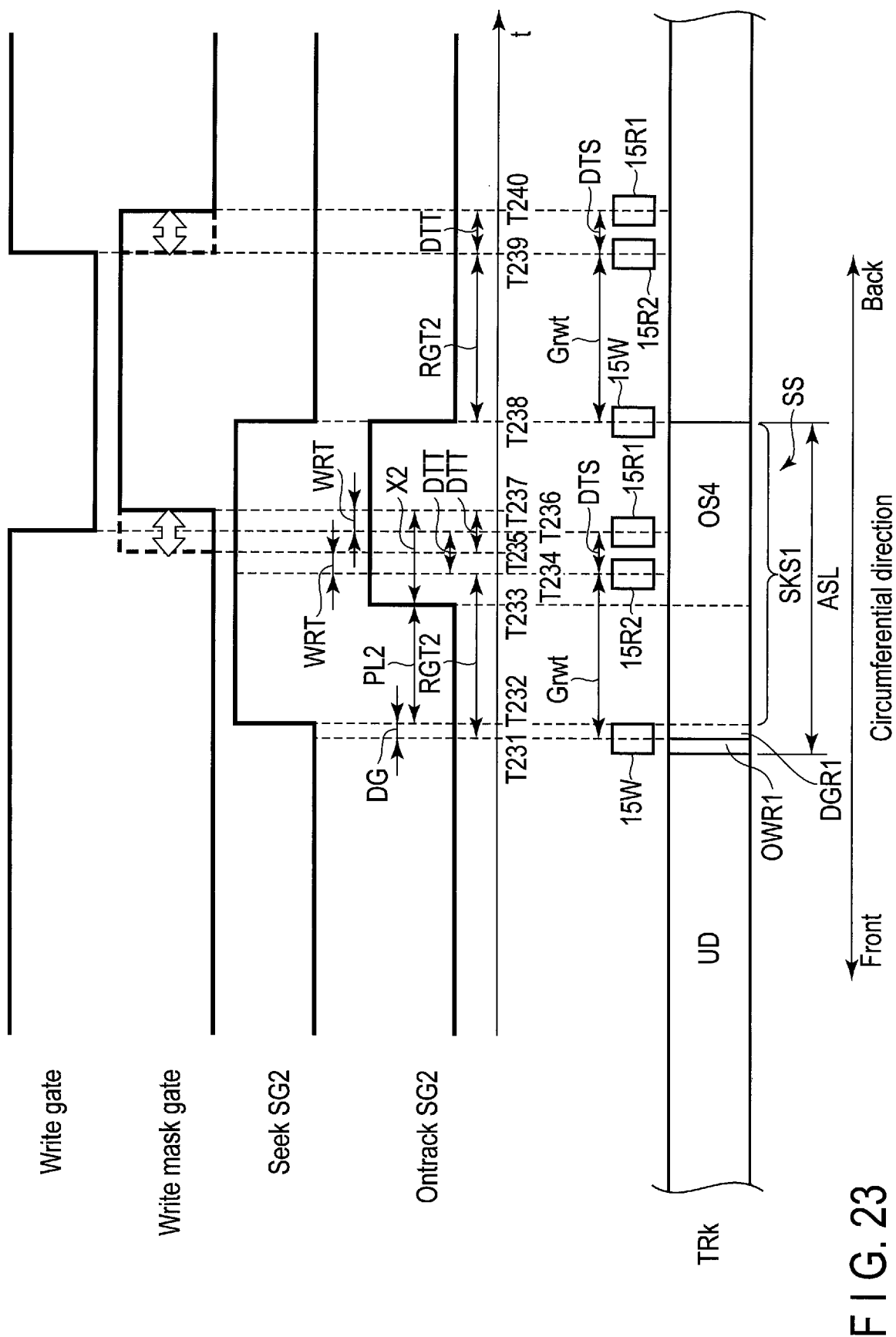
FIG. 23 is a schematic diagram showing an example of various gates and arrangement of a head, according to the fourth embodiment.

FIG. 23 is a schematic diagram showing an example of various gates and arrangement of a head 15, according to the fourth embodiment. FIG. 23 shows the write gate, the write mask gate, a seek servo gate (Seek SG2), and an ontrack servo gate (Ontrack SG2). The seek SG2 may be different from or the same as the seek SG1 shown in FIG. 5. The ontrack SG2 may be different from or the same as the ontrack SG1 shown in FIG. 5. These gates are asserted at rise and negated at fall. In FIG. 23, a horizontal axis of these gates represents time t. The horizontal axis of FIG. 23 shows timings T231, T232, T233, T234, T235, T236, T237, T238, T239, and T240. Timing T232 corresponds to the time after timing T231, timing T233 corresponds to the time after timing T232, timing T234 corresponds to the time after timing T233, and timing T235 corresponds to the time after timing T234. Timing T236 corresponds to the time after timing T235, timing T237 corresponds to the time after timing T236, timing T238 corresponds to the time after timing T237, timing T239 corresponds to the time after timing T238, and timing T240 corresponds to the time after timing T239. Timing T236 corresponds to the timing at which the write gate negates when the processing read head is the read head 15R1, timing T231 corresponds to the timing before the time obtained by adding the time (hereinafter often called a downtrack gap time) corresponding to the DTS to the read/write gap time RGT2 from timing T236 at which the write gate negates, timing T232 corresponds to the timing after the degauss time from timing T231 and the timing for assertion of the seek SG2, timing T233 corresponds to the timing at which the ontrack SG2 asserts, timing T235 corresponds to the timing at which the write mask gate asserts in a case of selecting the read head 15R2 as the processing read head, and timing T234 corresponds to the timing before the transition time WRT from timing T235 at which the write mask gate asserts in a case of selecting the read head 15R2 as the processing read head. Timing T237 corresponds to the timing at which the write mask gate asserts in a case of selecting the read head 15R1 as the processing read head, timing T236 corresponds to the timing before the transition time WRT from timing T237 at which the write mask gate asserts in a case of selecting the read head 15R1 as the processing head and the timing at which the write gate negates, timing T238 corresponds to the timing at which the seek SG2 and the ontrack SG2 negate, timing T239 corresponds to the timing at which the write gate asserts in a case where the processing read head is the read head 15R2 and the timing at which the write mask gate negates in a case of selecting the read head 15R2 as the processing read head, and timing T240 corresponds to the timing at which the write mask gate negates in a case of selecting the read head 15R1 as the processing read head.

A differential value of timings T231 and T232 corresponds to the degauss time DG, a differential value of timings T232 and T233 corresponds to an assert differential time PL2 between the timing of assertion of the seek SG2 and the timing of assertion of the ontrack normal SG2, a differential value between timings T233 and T237 corresponds to the time X2 between the timing of assertion of the ontrack SG2 and the timing of assertion of the write mask gate, and each of a differential value of timings T234 and T235 and a differential value of timings T236 and T237 corresponds to the transition time WRT. Each of a differential value of timings T234 and T236, a differential value of timings T235 and T237, and a differential value of timings T239 and T240 corresponds to the downtrack gap time DTT, and each of a differential value of timings T231 and T234 and a differential value of timings T238 and T239 corresponds to the read/write gap time RGT2.

For example, a differential value (degauss time) of timings T231 and T232 corresponds to the differential value of timings T51 and T52 shown in FIG. 5. The differential value (degauss time) of timings T231 and T232 may be different from the differential value of timings T51 and T52 shown in FIG. 5. For example, a differential value (transition time) of timings T234 and T235 and a differential value (transition time) of timings T236 and T237 correspond to the differential value of timings T54 and T55 shown in FIG. 5. The differential value (transition time) of timings T234 and T235 and the differential value (transition time) of timings T236 and T237 may be different from the differential value of timings T54 and T55. For example, a differential value (assert differential time) of timings T232 and T233 is different from the differential value of timings T52 and T53 shown in FIG. 5. The differential value (assert differential time) of timings T232 and T233 may be different from the differential value of timings T52 and T53 shown in FIG. 5. For example, a differential value (X2) of timings T233 and T237 is different from the differential value of timings T53 and T54 shown in FIG. 5. The differential value (X2) of timings T233 and T237 may be the same as the differential value of timings T53 and T54 shown in FIG. 5. For example, a differential value (read/write gap time) of timings T231 and T234 and a differential value (read/write gap time) of timings T238 and T239 are different from the differential value of timings T51 and T54 shown in FIG. 5. The differential value (read/write gap time) of timings T231 and T234 and the differential value (read/write gap time) of timings T238 and T239 may be the same as the differential value of timings T51 and T54 shown in FIG. 5.

In addition, FIG. 23 shows track TRk. In the example shown in FIG. 23, the user data UD and the servo sector SS are adjacent in the circumferential direction and do not include a gap or the like interposed therebetween. In the example shown in FIG. 23, the seek servo sector SKS1 corresponds to servo data necessary for the servo read corresponding to the seek SG2. The seek servo sector SKS1 includes an ontrack servo sector OS4. The ontrack servo sector OS4 corresponds to servo data necessary for the servo read corresponding to the ontrack SG2. The length of the ontrack servo sector OS4 is shorter than the length of the seek servo sector SKS1. For example, the region obtained by excluding the ontrack servo sector OS4 from the seek servo sector SKS1 corresponds to the region where the preamble is recorded. FIG. 23 shows a read head 15R1 for the track TRk at timing T236 at which the write gate is negated, a read head 15R2 for the read head 15R1 at timing T236, a write head 15W corresponding to the read head 15R1 at timing T236, a read head 15R2 for the track TRk at timing T239 at which the write gate is asserted, a read head 15R1 for the read head 15R2 at timing T239, and a write head 15W corresponding to the read head 15R2 at timing T239.

The system controller 130 negates the write gate so as not to write particular data to the servo sector SS, for example, the seek servo sector SKS1 at the servo read corresponding to the seek SG2 and the ontrack SG2 using the read head 15R1 as the processing read head. The system controller 130 asserts the write mask gate in accordance with the processing read head so as not to write particular data to the seek servo sector SKS1 at the servo read corresponding to the seek SG2 and the ontrack SG2. For example, the system controller 130 asserts the write mask gate based on assertion of the ontrack SG2, when executing the servo read using the read head 15R1 as the processing read head. In the example shown in FIG. 23, the system controller 130 asserts the write mask gate at timing T237 delayed by time X2 from timing T233 at which the ontrack SG2 has asserted, when executing the servo read using the read head 15R1 as the processing read head. For example, the system controller 130 calculates differential time X2 in the following equation.

$$X2=RGT2+DTT+WRT-DG-PL2 \quad (3)$$

For example, the system controller 130 asserts the write mask gate based on assertion of the write mask gate, when executing the servo read using the read head 15R2 as the processing read head and when executing the servo read using the read head 15R1 as the processing read head. In the example shown in FIG. 23, the system controller 130 asserts the write mask gate at timing T235 before the downtrack gap time DTT from timing T237 for assertion of the write gate in a case of executing the servo read using the read head 15R1 as the processing read head, when executing the servo read using the read head 15R2 as the processing read head.

The system controller 130 asserts the write gate so as not to overwrite particular data to the servo sector SS, for example, the ontrack servo sector OS4 after ending the servo read corresponding to the seek SG2 and the ontrack SG2 using the read head 15R2 as the processing read head. The system controller 130 negates the write mask gate in accordance with the processing read head so as not to overwrite particular data to the ontrack servo sector OS4 after ending the servo read corresponding to the seek SG2 and the ontrack SG2. For example, when executing the servo read using the read head 15R1 as the processing read head, the system controller 130 negates the write mask gate at timing T240 delayed by the time obtained by adding a downtrack gap time DTT to the read/write gap time RGT2 from timing T238 at which the servo read corresponding to the seek SG2 and the ontrack SG2 is ended.

For example, when executing the servo read using the read head 15R2 as the processing read head, the system controller 130 negates the write mask gate at timing T239 delayed by the read/write gap time RGTs from timing T238 at which the servo read corresponding to the seek SG2 and the ontrack SG2 is ended.

In the example shown in FIG. 23, when seeking the head 15 from the other track to the track TRk and executing the servo read, the system controller 130 asserts the seek SG2 and starts the read processing of the seek servo sector SKS1 at timing T232. When executing the servo read using the read head 15R2 as the processing read head, the system controller 130 asserts the write mask gate at timing T235 before the downtrack gap time DTT from timing T237 for assertion of the write mask gate in a case of executing the servo read using the read head 15R1 as the processing read head, after starting the read processing of the seek servo sector SKS1 at timing T232. When executing the servo read using the read head 15R1 as the processing read head, the system controller 130 asserts the write mask gate at timing T237 delayed by the time X2 from timing T233 for assertion of the ontrack SG2 after starting the read processing of the seek servo sector SKS1 at timing T232. The system controller 130 negates the seek SG2 and ends the read processing of the seek servo sector SKS1 at timing T238. When executing the servo read using the read head 15R2 as the processing read head, the system controller 130 negates the write mask gate at timing T239 and asserts the write gate at timing T239 after ending the read processing of the seek servo sector SKS1 at timing T238. When executing the servo read using the read head 15R1 as the processing read head, the system controller 130 asserts the write gate at timing T240 and negates the write mask gate at timing T240 delayed by the downtrack gap time DTT from timing T239 for negating the write mask gate in a case of executing the servo read using the read head 15R2 as the processing read head, after ending the read processing of the seek servo sector SKS1 at timing T238.

In the example shown in FIG. 23, the system controller 130 asserts the ontrack SG2 and starts the servo read of the ontrack servo sector OS4 at timing T233, when locating on a particular track and writing/reading the user data to execute the servo read. When executing the servo read using the read head 15R2 as the processing read head, the system controller 130 asserts the write mask gate at timing T235 before the downtrack gap time DTT from timing T237 for assertion of the write mask gate in a case of executing the servo read using the read head 15R1 as the processing read head, after starting the read processing of the ontrack servo sector OS4 at timing T233. When executing the servo read using the read head 15R1 as the processing read head, the system controller 130 asserts the write mask gate at timing T237 delayed by the time X2 from timing T233 for assertion of the ontrack SG2 after starting the read processing of the ontrack servo sector OS4 at timing T233. The system controller 130 negates the write gate and stops the write processing at timing T236 when executing the servo read using the read head 15R1 as the processing read head. The system controller 130 negates the write gate and stops the write processing at timing T234 when executing the servo read using the read head 15R2 as the processing read head. The system controller 130 negates the ontrack SG2 and ends the read processing of the ontrack servo sector OS4 at timing T238. When executing the servo read using the read head 15R2 as the processing read head, the system controller 130 negates the write mask gate at timing T239 and asserts the write gate at timing T239 after ending the read processing of the ontrack servo sector OS4 at timing T238. When executing the servo read using the read head 15R1 as the processing read head, the system controller 130 asserts the write gate at timing T240 and negates the write mask gate at timing T240 delayed by the downtrack gap time DTT from timing T239 for negating the write mask gate in a case of executing the servo read using the read head 15R2 as the processing read head, after ending the read processing of the ontrack servo sector OS4 at timing T238.

According to the fourth embodiment, the magnetic disk device 1 selects the processing read head at a plurality of read heads. For example, the magnetic disk device 1 generates the write gate based on the circumferential distance between the write head and the read head located at a position farthest from the write head 15W of the read heads, and a circumferential distance between the write head and the processing read head. The magnetic disk device 1 generates the write mask gate in accordance with, for example, the read head selected as the processing read head. For this reason, since the magnetic disk device 1 can improve the format efficiency of the disk 10 and detect abnormality that simultaneously asserts the write gate and the write mask gate, the magnetic disk device 1 can protect the servo data necessary for the servo control of the head 15. Therefore, the magnetic disk device 1 can improve the reliability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device, comprising:
   a disk including a first servo sector including a first preamble, a first servo mark, a first gray code, and first burst data;
   a head including a write head which writes data to the disk and a read head which reads data from the disk; and
   a controller which stops write processing, based on a write mask gate different from a first servo gate executing read processing of the first servo sector and a write gate executing the write processing to the disk.

2. The magnetic disk device of claim 1, wherein
   the controller stops the write processing when the write mask gate and the write gate are asserted simultaneously.

3. The magnetic disk device of claim 1, wherein
   the controller executes servo read of the first preamble, the first servo mark, the first gray code, and the first burst data of the first servo sector by the first servo gate.

4. The magnetic disk device of claim 3, wherein
   the first servo gate includes a second servo gate to seek and read and a third servo gate to locate on a track and read.

5. The magnetic disk device of claim 4, wherein
   the controller reads the first servo sector by the third servo gate, in a second length in a circumferential direction shorter than a first length in the circumferential direction of the disk of the first servo sector in which servo read is executed by the second servo gate.

6. The magnetic disk device of claim 5, wherein
   the controller asserts the write mask gate at second timing delayed by a first time from first timing at which the third servo gate is asserted.

7. The magnetic disk device of claim 6, wherein
   the controller calculates the first time, based on a second time corresponding to a distance in the circumferential direction of the write head and the read head, a third time corresponding to degauss, a fourth time corresponding to a differential value of the first length and the second length, and a fifth time at which the write processing transitions to the servo read processing.

8. The magnetic disk device of claim 7, wherein
the controller negates the write mask gate at fourth timing delayed by the second time from third timing at which the first servo gate is negated.

9. The magnetic disk device of claim 6, wherein
the disk includes a second servo sector including a second preamble, a second servo mark, a second gray code, and second burst data, and
the write mask gate includes a fourth servo gate which executes servo read of the second burst data.

10. The magnetic disk device of claim 9, wherein
the controller asserts the fourth servo gate at the second timing.

11. A servo read processing method applied to a magnetic disk device comprising a disk including a first servo sector including a first preamble, a first servo mark, a first gray code, and first burst data, and a head including a write head which writes data to the disk and a read head which reads data from the disk,
the method comprising:
stopping write processing, based on a write mask gate different from a first servo gate executing read processing of the first servo sector and a write gate executing the write processing to the disk.

12. The method of claim 11, further comprising:
stopping the write processing when the write mask gate and the write gate are asserted simultaneously.

13. The method of claim 11, further comprising:
executing servo read of the first preamble, the first servo mark, the first gray code, and the first burst data of the first servo sector by the first servo gate.

14. The method of claim 13, wherein
the first servo gate includes a second servo gate to seek and read and a third servo gate to locate on a track and read.

15. The method of claim 14, further comprising:
reading the first servo sector by the third servo gate, in a second length in a circumferential direction shorter than a first length in the circumferential direction of the disk of the first servo sector in which servo read is executed by the second servo gate.

16. The method of claim 15, further comprising:
asserting the write mask gate at second timing delayed by a first time from first timing at which the third servo gate is asserted.

17. The method of claim 16, further comprising:
calculating the first time, based on a second time corresponding to a distance in the circumferential direction of the write head and the read head, a third time corresponding to degauss, a fourth time corresponding to a differential value of the first length and the second length, and a fifth time at which the write processing transitions to the servo read processing.

18. The method of claim 17, further comprising:
negating the write mask gate at fourth timing delayed by the second time from third timing at which the first servo gate is asserted.

19. The method of claim 16, wherein
the disk includes a second servo sector including a second preamble, a second servo mark, a second gray code, and second burst data, and
the write mask gate includes a fourth servo gate which executes servo read of the second burst data.

20. The method of claim 19, further comprising:
asserting the fourth servo gate at the second timing.

* * * * *